(12) United States Patent
Sadeghi et al.

(10) Patent No.: US 11,834,077 B2
(45) Date of Patent: Dec. 5, 2023

(54) SYSTEMS, METHODS, AND MEDIA FOR OCCLUSION-AWARE MOTION PLANNING

(71) Applicants: Armin Sadeghi, Waterloo (CA); Barry Gilhuly, Waterloo (CA); Stephen L. Smith, Kitchener (CA); Peyman Yadmellat, North York (CA); Kasra Rezaee, Kitchener (CA)

(72) Inventors: Armin Sadeghi, Waterloo (CA); Barry Gilhuly, Waterloo (CA); Stephen L. Smith, Kitchener (CA); Peyman Yadmellat, North York (CA); Kasra Rezaee, Kitchener (CA)

(73) Assignees: Barry Gilhuly, Waterloo (CA); Armin Sadeghi, Waterloo (CA); Stephen L. Smith, Kitchener (CA); HUAWEI TECHNOLOGIES CANADA CO., LTD., Kanata (CA)

( * ) Notice: Subject to any disclaimer, the term of this patent is extended or adjusted under 35 U.S.C. 154(b) by 178 days.

(21) Appl. No.: 17/474,751

(22) Filed: Sep. 14, 2021

(65) Prior Publication Data
US 2023/0084578 A1 Mar. 16, 2023

(51) Int. Cl.
*B60W 60/00* (2020.01)
*B60W 30/095* (2012.01)
*G06N 3/02* (2006.01)

(52) U.S. Cl.
CPC ...... *B60W 60/0027* (2020.02); *B60W 30/095* (2013.01); *B60W 60/0015* (2020.02);
(Continued)

(58) Field of Classification Search
CPC ......... B60W 60/0027; B60W 60/0015; B60W 30/095; G06N 3/02
See application file for complete search history.

(56) References Cited

U.S. PATENT DOCUMENTS 10,627,812 B2 * 4/2020 Eggert ................ G05D 1/0088
11,513,519 B1 * 11/2022 Akella ................ G05D 1/0289
(Continued)

OTHER PUBLICATIONS

Michael Joseph Kuhlman, "Trajectory Planning for Autonomous Vehicles Performing Information Gathering Tasks", 2018, University of Maryland (Retrieved via Proquest) (Year: 2018).*
(Continued)

*Primary Examiner* — Hussein Elchanti
*Assistant Examiner* — Kenneth M Dunne

(57) ABSTRACT

Systems, methods and computer-readable media for selecting a trajectory for an autonomous vehicle are disclosed that include computing a current vehicle state for the autonomous vehicle based on observations by a sensing system; computing respective collision probability scores for a plurality of candidate trajectories based on the current vehicle state; computing respective information gain scores for the plurality of candidate trajectories based on the current vehicle state, the information gain score for each candidate trajectory indicating an respective information gain for a next planning horizon interval that is subsequent to the current planning horizon interval; and selecting a planned trajectory from the plurality of candidate trajectories based on the respective collision probability scores and respective information gain scores.

23 Claims, 7 Drawing Sheets

(52) U.S. Cl.
CPC ....... *G06N 3/02* (2013.01); *B60W 2554/4041* (2020.02); *B60W 2554/4045* (2020.02); *B60W 2554/4049* (2020.02)

(56) References Cited

U.S. PATENT DOCUMENTS

| | | | |
|---|---|---|---|
| 2017/0132334 A1 | 5/2017 | Levinson et al. | |
| 2019/0025841 A1* | 1/2019 | Haynes | G05D 1/0214 |
| 2019/0369637 A1 | 12/2019 | Shalev-Shwartz et al. | |
| 2020/0103523 A1* | 4/2020 | Liu | G01S 13/865 |
| 2020/0174481 A1* | 6/2020 | Van Heukelom | B60W 60/0015 |
| 2020/0225669 A1* | 7/2020 | Silva | B60W 60/0011 |
| 2020/0231149 A1* | 7/2020 | Eggert | B60W 60/00274 |
| 2021/0253128 A1 | 8/2021 | Nister et al. | |
| 2021/0354690 A1* | 11/2021 | Yershov | B60W 30/08 |
| 2022/0180170 A1* | 6/2022 | Ivanovic | G06N 3/047 |
| 2022/0185267 A1* | 6/2022 | Beller | B60W 60/0015 |
| 2023/0015466 A1* | 1/2023 | Jiralerspong | G08G 1/166 |

OTHER PUBLICATIONS

Wu et al, "An Information Potential Approach to Integrated Sensor Path Planning and Control", 2014, IEEE (Year: 2014).*
Limited Visibility and Uncertainty Aware Motion Planning for Automated Driving , OmerTa$ and Christoph Stiller, 2018 IEEE Intelligent Vehicles Symposium (IV), Changshu, Suzhou, China, (pp. 1171-1178 Jun. 2018.
Safe but not Overcautious Motion Planning under Occlusions and Limited Sensor Range , Maximilian Naumann, Hendrik KOnigshof, Martin Lauer and Christoph Stiller. 2019 IEEEIntelligent Vehicles Symposium (IV), Paris, France, (pp. 140-145) Jun. 2019.
Tackling Occlusions and Limited Sensor Range with Set-based Safety Verification , PiotrOrzechowski, Annika Meyer and Martin Lauer, 2018 21st International Conference onIntelligent Transportation Systems (ITSC), Maui, Hawaii, USA, pp. 1729-1736 Nov. 2018.
Nager, Yannik et al. What lies in the shadows? Safe and computation-aware motion planning for autonomous vehicles using intent-aware dynamic shadow regions. 2019 International Conference on Robotics and Autionmation May 20, 2019.
Lawitzky, Andreas et al. "Determining States of Inevitable Collision using Reachability Analysis" 2014 IEEE Sep. 14, 2014.
Damerow, Florian et al. "Risk-Based Driver Assistance for Approaching Intersections of Limited Visibility" 2017 IEEE Jun. 27, 2017.
Lee, Minchul et al. "Collision Risk Assessment for Possible COllision Vehicle in Occluded Area Based on Precise Map" 2017 IEEE.
Paden, Brian et al. "A Generalized Label Correcting Method for Optimal Kinodynamic Motion Planning" Algorithmic Foundations of Robotics XII, SPAR 13 pp. 512-527, 2020 2020.
Bouraine, Sara et al. "Provably safe navigation for mobile robots with limited field-of-views in dynamic environments" Auton Robot (2012) 32:267-283 Feb. 3, 2011.
Poncelet, Renaud et al. "Safe Geometric Speed Planning Approach for Autonomous Driving through Occluded Intersections" 2020 16th International Conference on Control, Automation, Robotics and Vision Dec. 13, 2020.

Orzechowski, Piotr et al. "Tackling Occlusions & Limited Sensor Range with Set-based Safety Verification" 2018 IEEE May 6, 2019.
Althoff, Matthias et al. "Set-Based Prediction of Traffic Participants on Arbitrary Road Networks" IEEE Transactions on Intelligent Vehicles Oct. 2016.
Neel, Garrison et al. "Improving Bounds on Occluded Vehicle States for Use in Safe Motion Planning" 2020 IEEE International Symposium on Safety, Security, and Rescue Robotics Nov. 4, 2020.
Yu, Ming-Yuan et al. Risk Assessment and Planning with Bidirectional Reachability for Autonomous Driving: 2020 IEEE International Conference on Robotics and Automation May 31, 2020.
Wang, Lingguang et al. "Generating Efficient Behaviour with Predictive Visibility Risk for Scenarios with Occlusions".
Yu, Ming-Yuan et al. "Occlusion-Aware Risk Assessment for Autonomous Driving in Urban Environments" Jul. 17, 2019.
Bajcsy, Andrea et al. "An Efficient Reachability-Basef Framework for Provably Safe Autonomous Navigation in Unknown Environments" 2019 IEEE 58th Conference on Decision and Control Dec. 11, 2019.
Hubmann, Constantin et al. "A POMDP Maneuver Planner for Occlusions in Urban Scenarios" 2019 IEEE Intelligent Vehicles Symposium (IV) Jun. 9, 2019.
Hubmann, Ceuvers in Congested onstantin et al. "A belief State Planner for Interactive Merge Maneuvers in Congested Traffic" 2018 21st International Conference on Intelligent Transportation Systems Nov. 4, 2018.
Hoermann, Stefan et al. "Dynamic Occupancy Grid Prediction for Urban Autonomous Driving: A Deep Learning Approach with Automatic Labeling" 2018 IEEE International Conference on Robotics and Automation May 5, 2018.
Debada, Ezequiel et al. "Occlusion-Aware Motion Planning at Roundabouts" IEEE Transactions on Intelligent Vehicles Jun. 2, 2021.
Fulgenzi, Chiara et al. "Dynamic Obstacle Avoidance in uncertain environment combining PVOs and Occupancy Grid" 2007 IEEE International Conference on Robotics and Automation Apr. 10, 2007.
Naumann, Maximilian et al. "Safe but not Overcautious Motion Planning under Occlusions and Limited Sensor Range" 2019 IEEE Intelligent Vehicles Symposium Jun. 9, 2019.
McGill, Stephen G. et al. "Probabilistic Risk Metrics for Navigating Occluded Intersections" IEEE Robotics and Automation Letters, vol. 4 No. 4 Oct. 4, 2019.
Negre, Amaury et al. "Hybrid Sampling Bayesian Occupancy Filter" 2014 IEEE Intelligent Vehicles Symposium Jun. 8, 2014.
Tay, M.K. et al. "An Efficient Formulation of the Bayesian Occupation Filter for Target Tracking in Dynamic Environments".
Andersen, Hans et al. "Trajectory Optimization and Situational Analysis Framework for Autonomous Overtaking With Visibility Maximization" IEEE Transactions on Intelligent Vehicles vol. 5, No. 1 Mar. 1, 2020.
Sun, Liting Sun et al. "Behavior Planning of Autonomous Cars with Social Perception" May 2, 2019.
Higgins, Jacob et al. "Negotiating Visibility for Safe Autonomous Navigation in Occluding and Uncertain Environments" IEEE Robotics and Automation Letters, vol. 6, No. 3 Jul. 3, 2021.

* cited by examiner

SYSTEMS, METHODS, AND MEDIA FOR OCCLUSION-AWARE MOTION PLANNING

FIELD

The present disclosure is related to systems, methods, and computer-readable media for occlusion-aware motion planning, and in particular to safe motion planning when a field of view is limited.

BACKGROUND

An autonomous vehicle (e.g. a self-driving car) is a vehicle that includes different types of sensors to sense an environment surrounding the vehicle (e.g., the presence and state of stationary and dynamic objects that are in the vicinity of the vehicle) and operating parameters of the vehicle (e.g. vehicle speed, acceleration, pose, etc.) and is capable of operating itself safely without any human intervention. An autonomous vehicle typically includes various software systems for perception and prediction, localization and mapping, as well as for planning and control. The software system for planning (generally referred to as a planning system) plans a trajectory for the vehicle to follow based on target objectives, the vehicle's surrounding environment, and physical parameters of the vehicle (e.g. wheelbase, vehicle width, vehicle length, etc.). A software system for control of the vehicle (e.g. a vehicle control system) receives the trajectory from the planning system and generates control commands to control operation of the vehicle to follow the trajectory.

The planning system may include multiple planners (which may also be referred to as planning units, planning sub-systems, planning modules, etc.) arranged in a hierarchy. The planning system generally includes: a mission planner, a behavior planner, and a motion planner. The motion planner receives as input a planned behavior for the autonomous vehicle generated by the behavior planner as well as information about the environment and information about the vehicle, performs motion planning to generate a trajectory for the autonomous vehicle, and outputs the trajectory for the autonomous vehicle to follow. In the present disclosure, a trajectory is a sequence, over multiple time steps, of a spatial position for the autonomous vehicle (in a geometrical coordinate system) and other parameters. Other parameters may include vehicle orientation, vehicle velocity, vehicle acceleration, vehicle jerk or any combination thereof.

Some approaches to motion planning involve the operations of trajectory generation, trajectory evaluation, trajectory sorting, and trajectory selection. Trajectory generation typically involves generating all possible trajectories for the autonomous vehicle. Trajectory generation may use some known data (e.g., current vehicle state) to generate a set of reasonable trajectories that are to be evaluated. Trajectory evaluation typically involves evaluating the generated trajectories (e.g., using some quantitative metrics) to compare the trajectories and trajectory sorting typically involves sorting or ranking the generated trajectories by the degree to which they satisfy of one or more objectives. Trajectory selection typically involves selecting a desired trajectory from the generated trajectories based on the evaluation and sorting of the generated trajectories. The operations of trajectory generation, trajectory evaluation, trajectory sorting and trajectory selection are typically performed by a motion planner, and the operations can follow an iterative process wherein the trajectories generated by the trajectory generation are refined based on the set of sorted trajectories that are the output of the trajectory evaluation and sorting operations.

The objectives used by a trajectory evaluation operation may include objectives related to safety, comfort, and mobility (i.e. moving the vehicle toward its destination). Existing rule-based motion planning techniques typically require evaluation (e.g., comparison and sorting) of the generated trajectories according to explicitly defined cost functions that may take into account various objectives to calculate a cost associated with each trajectory being compared. The trajectories being compared may then be sorted by their associated estimated costs. A typical cost function is computed by combining weighted costs associated with the various objectives into an overall cost function. For example, a cost function in a conventional trajectory evaluator may consider the objectives (comfort, safety, mobility) in determining a cost function.

The objective of safety is typically given a high priority in the context of motion planning. Uncertainty, which is inherent in many vehicle operating environments, creates several challenges to safe local motion planning. Causes of uncertainty can include, among other things: 1) the unpredictability of dynamic objects such as other vehicles, pedestrians, cyclists, which require probabilistic trajectory predictions; 2) vehicle localization (e.g., determining an accurate position of a vehicle); 3) vehicle controller errors (e.g., failure of a vehicle to accurately follow an intended trajectory); or 4) limitations to the vehicle's field-of-view (FOV) that is available from the sensors of the vehicle that sense a surrounding environment of the vehicle.

FOV limitations that result in unobserved regions can create a high degree of uncertainty in detecting objects in a vehicle's surrounding environment. FOV limitations can arise for multiple reasons, including for example blind spots due to limited coverage provided by a vehicle' sensors (such as LiDAR, Radar, and Camera based sensors) as well as occluded regions that are created due to interference by dynamic and static objects that obstruct the vehicle's sensors. These FOV limitations can potentially result in unsafe trajectories for the vehicle. Some known solutions address this problem by predicting the worst case scenario by assuming that unobserved regions each contain a respective phantom object that can move in any direction and with any speed. In most cases, the worst case planning results in overly cautious motion planning, which may lead to an unrecoverable state for the vehicle. For example, in a case where a vehicle needs to make a turn at a T-junction where the vehicle's field of view is obstructed by tall trees and parked vehicles, the vehicle may get stuck as it cannot find a safe trajectory that will overcome the assumed worst-case scenario.

The known solutions to the problem of trajectory planning when confronted with a limited FOV that results in unobserved regions include: reachability set analysis-based methods; probabilistic methods; and scenario specific methods.

Reachability set analysis-based methods are configured to find the subset of environment reachable by a hypothetical dynamic obstacle in an unobserved region within a time horizon. A trajectory is planned that avoids the subset of environment reachable by other dynamic obstacles in the environment. The resulting trajectory will typically be safe under worst-case scenarios. In particular, reachability set analysis-based methods find the set of unsafe states for an ego vehicle by simulating hypothetical dynamic obstacles in the environment according to a pre-defined dynamic model. However, if the dynamic model does not accurately represent the behavior of all of the hypothetical dynamic obstacles assumed to be in the environment, then the planner must compensate by over-approximating the unsafe regions in the environment and generating a trajectory that is too conservative.

In contrast to the reachability set analysis-based methods, probabilistic methods consider a discrete representation of the environment (e.g., a dynamic grid map) where each grid map cell is assigned a probability that the corresponding location is occupied by a dynamic obstacle. Such methods also rely on a worst case scenario assumption.

Scenario-specific methods are directed to specific scenarios. One known method is specific to autonomous overtaking and is based on visibility maximization, where a vehicle tries to increase the field of view by cutting into the opposite lane if the distance to the closest obstacle is within a safe margin. If there are more than one obstacles on the opposite lane, then the overtaking maneuverer is decided based on the distance gap between the obstacles. The approach is a rule-based approach which can only be applied to simple overtaking scenarios and cannot be extended to other scenarios in autonomous driving.

Accordingly, there is a need for a method, system and medium that can enable effective safe motion planning trajectories to be determined in the presence of uncertainties in the environment caused when a vehicle's FOV is limited.

SUMMARY

In various aspects, a method for operating an autonomous vehicle is disclosed that includes: computing a current vehicle state for the autonomous vehicle based on observations by a sensing system, the current vehicle state including environmental data about an environment that the autonomous vehicle interacts with; computing, based on the current vehicle state and a target goal, a plurality of candidate trajectories for a current planning horizon interval; computing respective collision probability scores for the plurality of candidate trajectories based on the current vehicle state, the collision probability score for each candidate trajectory indicating a probability of the autonomous vehicle colliding along the candidate trajectory with an object in the environment during the current planning horizon interval; computing respective information gain scores for the plurality of candidate trajectories based on the current vehicle state, the information gain score for each candidate trajectory indicating an respective information gain for a next planning horizon interval that is subsequent to the current planning horizon interval; and selecting a planned trajectory from the plurality of candidate trajectories based on the respective collision probability scores and respective information gain scores.

In at least some examples, the method includes instructing an electromechanical system of the autonomous vehicle to implement the planned trajectory.

In at least some applications, selecting a trajectory for a current planning horizon interval based on objectives of avoiding a collision in the current planning horizon interval and improving an information gain for a future planning horizon interval can enable an autonomous vehicle to engage in behaviors that is both safe and not overly conservative.

In some examples of the various aspects, the method includes generating a current occupancy grid that includes a plurality of cells each corresponding to a respective region of the environment, each cell that corresponds to a respective region of the environment that is observed by the sensing system for a current time step being assigned a first cell value when the respective region is observed to be occupied and a second cell value when the respective region is observed to be unoccupied, each cell that corresponds to a respective region of the environment that is unobserved by the sensing system for the current time step being assigned, based on the current vehicle state and assigned cell values of one or more occupancy grids generated for one or more previous time steps prior to the current time step, an occupancy probability value indicating a probability that the cell is occupied, the respective information gain scores for the plurality of candidate trajectories being computed based on the current occupancy grid.

According to one or more of the preceding aspects, the current occupancy grid comprises a plurality of dynamic agent specific occupancy grids that each correspond to a different class of dynamic agent.

According to one or more of the preceding aspects, the method comprises generating a current occupancy graph that includes a plurality of nodes each corresponding to a respective region of the environment and a plurality of edges connecting nodes that correspond to neighboring regions, each node that corresponds to a respective region of the environment that is observed by the sensing system for a current time step being assigned a first node value when the respective region is observed to be occupied and a second node value when the respective region is observed to be unoccupied, each node that corresponds to a respective region of the environment that is unobserved by the sensing system for the current time step being assigned, based on the current vehicle state and assigned node values of one or more occupancy graphs generated for one or more previous time steps prior to the current time step, an occupancy probability value indicating a probability that the node is occupied, the respective information gain scores for the plurality of candidate trajectories being computed based on the current occupancy graph.

In some examples of the various aspects, the method includes determining a nominal trajectory for the next planning horizon interval, wherein the respective information gain score for each candidate trajectory is computed based on a predicted information gain for the candidate trajectory relative to the nominal trajectory.

In some examples of the various aspects, the predicted information gain for each candidate trajectory is determined using a trained convolutional neural network to predict a set of visibility grids that each represent a future visibility of the environment to the sensor system for a respective lateral deviation of the nominal trajectory from the current vehicle state, the predicted information gain being based on a combination of the set of visibility grids and the current occupancy grid.

In some examples of the various aspects, the method includes encoding the nominal trajectory as a region of interest represented by a region of interest grid that includes cells that correspond to the same respective regions of the environment as cells of the current occupancy grid, the trained convolutional neural network receiving the current occupancy grid and the region of interest grid as inputs to predict the set of visibility grids.

In some examples of the various aspects, generating the current occupancy grid comprises: generating a current dynamic first agent occupancy grid that includes a plurality of dynamic first agent cells each corresponding to a respective region of the environment that a first class of dynamic agent is expected to travel within, each dynamic first agent cell that corresponds to a respective region of the environment that is observed in the current time step by the sensing system being assigned a first value when the respective region is observed to be occupied by a dynamic agent of the first class and a second value when the respective region is observed to be unoccupied by a dynamic agent of the first class, each dynamic first agent cell that corresponds to a respective region of the environment that is unobserved by the sensing system in the current time step being assigned, based on the current vehicle state and assigned dynamic first agent cell values of one or more dynamic first agent occupancy grids generated for one or more previous time steps prior to a current time step, a dynamic first agent cell probability value indicating a probability that the dynamic first agent cell is occupied by a dynamic agent of the first class; generating a current dynamic second agent occupancy grid that includes a plurality of dynamic second agent cells each corresponding to a respective region of the environment that a second class of dynamic agent is expected to travel within, each dynamic second agent cell that corresponds to a respective region of the environment that is observed in the current time step by the sensing system being assigned the first value when the respective region is observed to be occupied by a dynamic agent of the second class and the second value when the respective region is observed to be unoccupied by a dynamic agent of the second class, each dynamic second agent cell that corresponds to a respective region of the environment that is unobserved by the sensing system in the current time step being assigned, based on the current vehicle state and assigned dynamic second agent cell values of one or more second dynamic agent occupancy grids generated for one or more previous time steps prior to a current time step, a dynamic second agent cell probability value indicating a probability that the dynamic second agent cell is occupied by dynamic agent of the second class; and combining the current dynamic first agent occupancy grid and the current dynamic second agent occupancy grid to provide the current occupancy grid.

In some examples of the various aspects, the first class of dynamic agent corresponds to a class of vehicles that are expected to travel on a roadway in accordance with a first set of operating behaviors, and the first dynamic agent cells each correspond to a respective roadway region of the environment; and the second class of dynamic agent corresponds to a class of agents that are expected to travel both on the roadway and on non-roadway regions according to a second set of operating behaviors, and the second dynamic agent cells each correspond to a respective region of the environment that can include one or both of a roadway region or a non-roadway region.

In some examples of the various aspects, the second class of dynamic agent can correspond to a pedestrian class.

In some examples of the various aspects, the respective collision probability scores for the plurality of candidate trajectories are computed by: computing a first collision probability score for each candidate trajectory based on the current dynamic first agent occupancy grid; computing a second collision probability score for each candidate trajectory based on the current dynamic second agent occupancy grid; and computing the collision probability score for each candidate trajectory based on the first collision probability score and the second candidate probability score for the candidate trajectory.

In some examples of the various aspects, computing the plurality of candidate trajectories for a current planning horizon interval comprises computing a first set of trajectories, based on the current vehicle state and the target goal, for the current planning horizon interval and filtering the first set of trajectories to include only trajectories that correspond to a set of known safe trajectories in the plurality of candidate trajectories.

In some aspects, the present disclosure provides a system for selecting a trajectory for an autonomous vehicle, the system comprising a processing system configured by instructions to cause the system to perform any of the aspects of the method described above.

In some aspects, the present disclosure provides a computer-readable medium storing instructions for execution by a processing system of a system for selecting a trajectory for an autonomous vehicle. The instructions when executed cause the system to perform any of the aspects of the method described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

In various examples, the present disclosure describes systems, methods and computer-readable media for determining a safe trajectory for an autonomous vehicle when the field of view (FOV) provided by the vehicle's sensor system is limited, resulting in unobserved regions. FOV limitations may arise from one or more causes, including for example, sensor configuration, sensor range, and sensor obstructions caused by dynamic and static objects within a vehicle's environment.

The systems, methods and computer-readable media of the present disclosure are described in the context of autonomous vehicles. As described above, an autonomous vehicle (e.g. a self-driving car) is a vehicle that includes different types of sensors to sense a vehicle state, which can include an environmental data (e.g., information about the environment surrounding the vehicle, including dynamic and stationary objects in the vicinity of the vehicle) and a vehicle operating state (e.g., operating properties of the vehicle including speed, acceleration, pose, etc.), and is capable of operating itself safely without any human intervention, or with minimal human intervention in some circumstances. An autonomous vehicle typically includes various software systems for perception and prediction, localization and mapping, as well as for planning and control. The software system for planning (generally referred to as a planning system) plans a trajectory for the vehicle to follow based on target objectives and physical parameters of the vehicle (e.g. wheelbase, vehicle width, vehicle length, etc.). A software system for control of the vehicle (e.g. a vehicle control system) receives the trajectory from the planning system and generates control commands to control operation of the vehicle to follow the trajectory. Although examples described herein may refer to a car as the autonomous vehicle, the teachings of the present disclosure may be implemented in other forms of autonomous (including semi-autonomous) vehicles including, for example, trams, subways, trucks, buses, surface and submersible watercraft and ships, aircraft, drones (also referred to as unmanned aerial vehicles (UAVs)), warehouse equipment, manufacturing facility equipment, construction equipment, farm equipment, mobile robots such as vacuum cleaners and lawn mowers, and other robotic devices. Autonomous vehicles may include vehicles that do not carry passengers as well as vehicles that do carry passengers.

Figure 1:
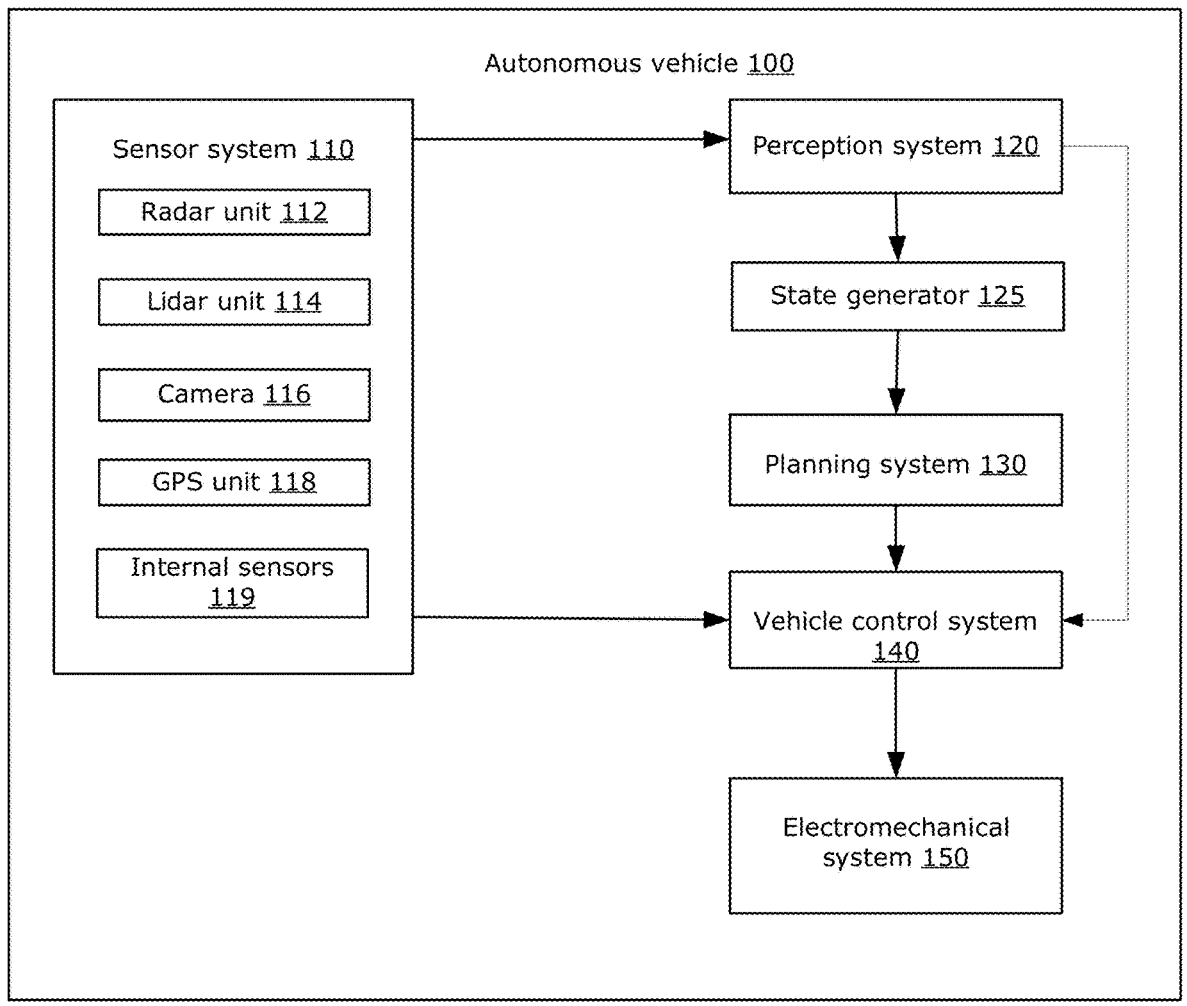
FIG. 1 is a block diagram illustrating some components of an example autonomous vehicle.

FIG. 1 is a block diagram illustrating certain components of an example autonomous vehicle 100 (otherwise referred to herein as "the vehicle 100" or "the ego vehicle 100").

The vehicle 100 includes a sensor system 110, a perception system 120, a state generator 125, a planning system 130, a vehicle control system 140 and an electromechanical system 150, for example. Other systems and components may be included in the vehicle 100 but are not shown for ease illustration. The perception system 120, the planning system 130, and the vehicle control system 140 in this example are distinct software systems that include machine readable instructions that may be executed by one or more processors in a processing system of the vehicle 100. Alternatively, the perception system 120, the planning system 130, and the vehicle control system 140 may be distinct systems on one or more chips (e.g., application-specific integrated circuit (ASIC), field-programmable gate array (FGPA), and/or other type of chip). For example, the perception system 120, the planning system 130, and the vehicle control system 140 may be implemented using one chip, two chips, or three distinct chips (using the same or different types of chips). Various systems and components of the vehicle may communicate with each other, for example through wired or wireless communication. For example, the sensor system 110 may communicate with the perception system 120 and the vehicle control system 140; the perception system 120 may communicate with the state generator 125; the state generator 125 may communication with the planning system 130 and the vehicle control system 140; the planning system 130 may communicate with the vehicle control system 140; and the vehicle control system 140 may communicate with the electromechanical system 150.

FIG. 1 illustrates example flows of data (indicated by arrows) from the sensor system 110 to the perception system 120, to the planning system 130, to the vehicle control system 140, and to the electromechanical system 150 (discussed in further detail below). However, it should be understood that data may be communicated among the systems 110, 120, 125, 130, 140, 150 in various different ways, and there may be two-way data communication among the systems 110, 120, 125, 130, 140, 150. The sensor system 110 includes various sensing units, such as a radar unit 112, a LIDAR unit 114, and a camera 116, for collecting information about an environment surrounding the vehicle 100 as the vehicle 100 operates in the environment. The sensor system 110 also includes a global positioning system (GPS) unit 118 for collecting information about a location of the vehicle in the environment. The sensor system 110 also includes one or more internal sensors 119 for collecting information about the physical operating conditions of the vehicle 100 itself, including for example sensors for sensing steering angle, linear speed, linear and angular acceleration, pose (pitch, yaw, roll), compass travel direction, vehicle vibration, throttle state, brake state, wheel traction, transmission gear ratio, cabin temperature and pressure, etc. Other sensors not shown in FIG. 1 may be included in the sensor system 110, such as environmental sensors for sensing external conditions such as an external temperature and pressure, precipitation, and noise, among other possibilities.

Information collected by each sensing unit of the sensor system 110 is provided as sensor data to the perception system 120. The perception system 120 processes the sensor data received from each sensing unit to generate data about the vehicle and data about the surrounding environment. Data about the vehicle includes, for example, one or more of data representing a vehicle location (e.g., including data about a geographic location of the vehicle 100, which may be in absolute geographical longitude/latitudinal values and/or values that reference other frames of reference), data representing the physical attributes of the vehicle, such as width and length, mass, inertia, wheelbase, slip angle, cornering forces, and data about the motion of the vehicle, such as linear speed and acceleration, travel direction, angular acceleration, pose (e.g., pitch, yaw, roll), and vibration, and mechanical system operating parameters such as engine RPM, throttle position, brake position, and transmission gear ratio, etc.). Data about the surrounding environment may include, for example, information about detected stationary and moving objects around the vehicle 100, weather and temperature conditions, road conditions, road configuration and other information about the surrounding environment. For example, sensor data received from the radar, LIDAR and camera units 112, 114, 116 may be used to determine the local environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). Sensor data from GPS unit 118 and other sensors may be used to determine the vehicle's location, defining a geographic position of the vehicle 100. Sensor data from internal sensors 119, as well as from other sensor units, may be used to determine the vehicle's motion attributes, including speed and pose (i.e. orientation) of the vehicle 100 relative to a frame of reference.

In some examples, the perception system 120 may also have access to a map (not shown), which may be a reference map that represents known information about the surrounding environment. For example, the map may be received from an external reference database (e.g., retrieved based on the vehicle's position, as determined using the GPS unit 118). The map may be used by the perception system 120 to assist in generating data about the physical environment, such as resolving ambiguities about the vehicle's location or the identity of sensed objects. The map may also be used by the planning system 130 described below to assist in planning a trajectory for the vehicle.

The perception system 120 in the present disclosure is described as a general system that performs various processing functions on the data about the vehicle 100 and the data about the environment. In some implementations, the perception system 120 may be implemented using various sub-systems for performing different functions. For example, the perception system 120 may provide the functions of sensor fusion (e.g. fusing the sensor data received from two or more sensing units), localization (e.g. using the map and sensor data from the GPS unit 118 and/or other sensing units to determine the geographic position of the vehicle 100), semantic understanding (e.g. using sensor data to identify the meaning of traffic signs, traffic signals, and other signifiers as part of the data about the environment), object detection and tracking (e.g. using sensor data to detect and track objects in the physical environment as part of the data about the environment), and/or processing a world model (e.g. a model of the environment that may be generated and/or compared to the data about the environment), among others. Some of these functions may be implemented using different sub-systems (e.g., a fusion sub-system or a state estimator sub-system) within the perception system 120, in some practical implementations. The present disclosure refers to the perception system 120 in general, for simplicity, and without loss of generality. The data output by the perception system 120 may include data about the vehicle 100 and data about the environment that is minimally processed (e.g., normalized and/or filtered to remove noise). The perception system 120 may also perform more extensive processing of the data about the vehicle 100 and the data about the environment, for example to generate an Occupancy Grid Map (OGM) and predicted future OGMs, to detect and classify objects of interest (e.g., other vehicles, pedestrians, etc.), to detect position and speed of objects categorized by their class, to detect road lane markings and the position of the centre of lane, etc. Thus, the data output by the perception system 120 may include both analyzed (or estimated) data (e.g., OGMs and object classifications) about the environment as well as simple data about the vehicle 100 (e.g., vehicle speed, vehicle acceleration, etc.).

Figure 3:
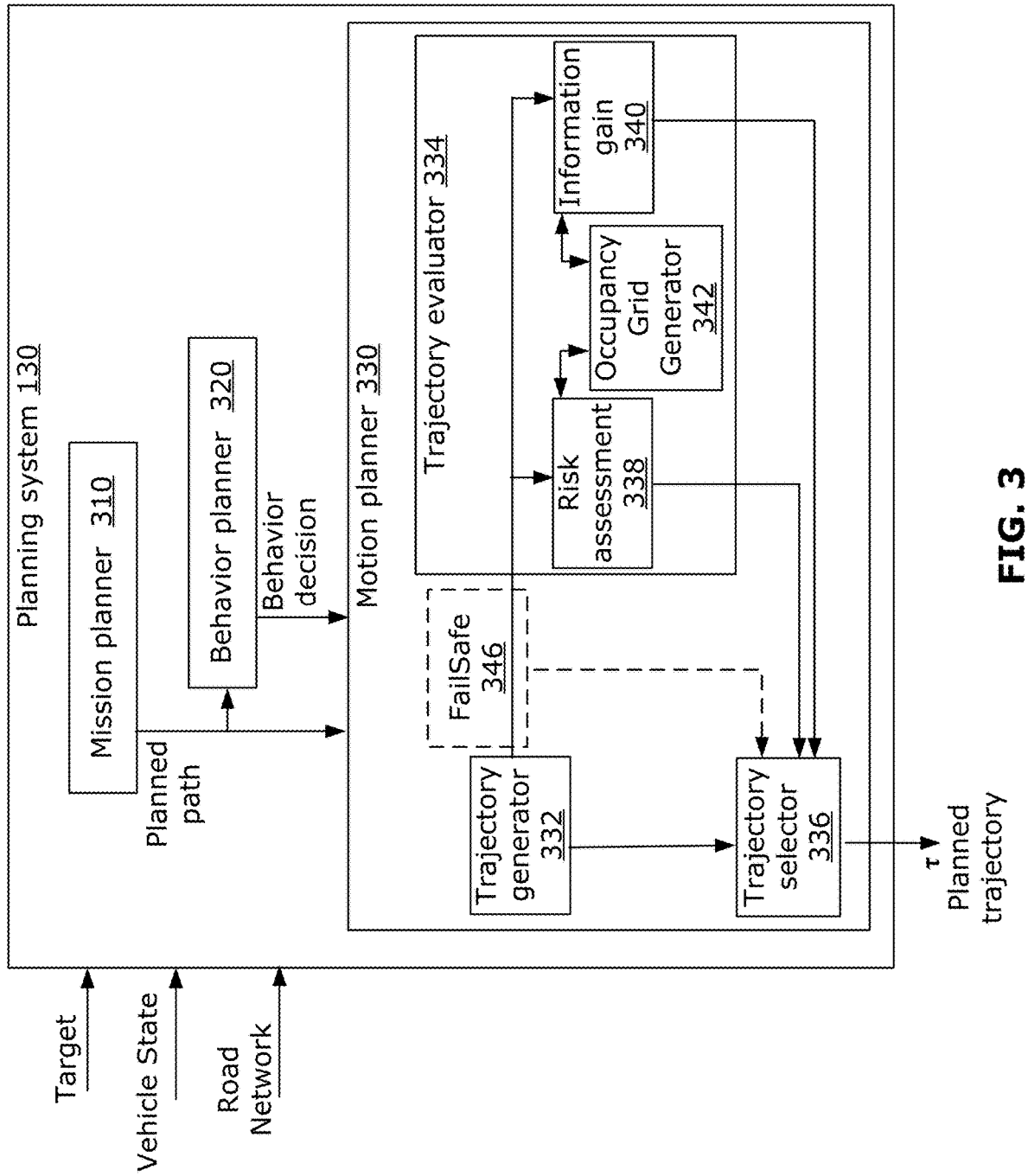
FIG. 3 is a block diagram illustrating further details of an example planning system.

The data about the environment and the data about the vehicle 100 output by the perception system 120 is received by the state generator 125. The state generator 125 processes data about the environment and the data about the vehicle 100 to generate a state for the vehicle 100 (hereinafter vehicle state). Although the state generator 125 is shown in FIG. 3 as a separate software system, in some embodiments, the state generator 125 may be included in the perception system 120 or in the planning system 130.

The vehicle state is output from the state generator 125 in real-time to the planning system 130, which is the focus of the current disclosure and will be described in greater detail below. The vehicle control system 140 serves to control operation of the vehicle 100 based on a trajectory generated output by the planning system 130. The vehicle control system 140 may be used to generate control signals for the electromechanical components of the vehicle 100 to control the motion of the vehicle 100. The electromechanical system 150 receives control signals from the vehicle control system 140 to operate the electromechanical components of the vehicle 100 such as an engine, transmission, steering system and braking system.

Figure 2:
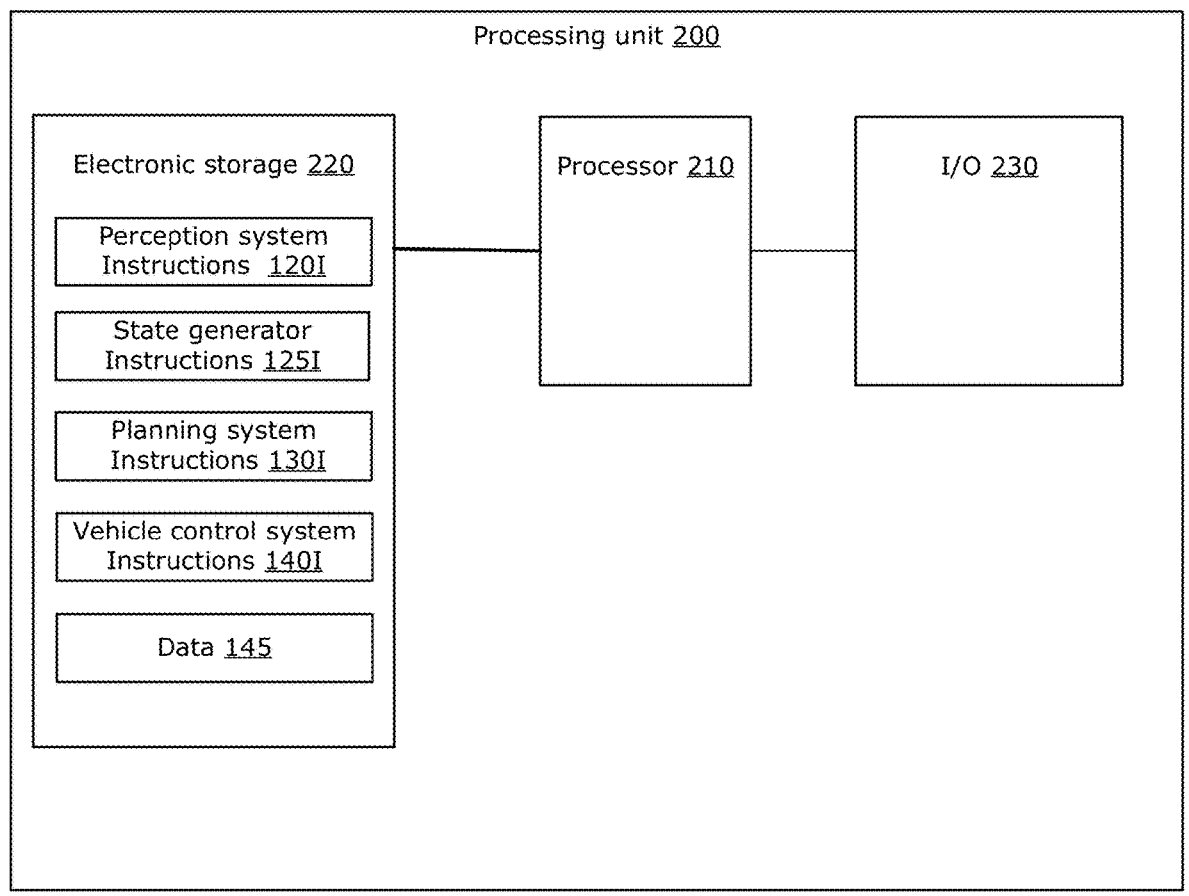
FIG. 2 is block diagram illustrating some components of a processing system that may be used to implement a planning system of the autonomous vehicle of FIG. 1 according to example embodiments.

FIG. 2 shows illustrates an example of a processing system 200 that may be implemented in the vehicle 100. The processing system 200 includes one or more processors 210. The one or more processors 210 may include a central processing unit (CPU), a graphical processing unit (GPU), a tensor processing unit (TPU), a neural processing unit (NPU), a digital signal processor, and/or another computational element. The processor(s) 210 are coupled to an electronic storage 220 and to one or more input and output (I/O) interfaces or devices 230 such as network interfaces, user output devices such as displays, user input devices such as touchscreens, and so on. In some examples, the sensor system 110 and/or the electromechanical system 150 may be considered an input device and an output device respectively. The electronic storage 220 can include one or more non-transient or tangible memories (for example flash memory) and/or transient memories (for example RAM). The tangible memory(ies) may store instructions, data and/or software modules for execution by the processor(s) 210 to carry out the functions of the systems described herein. The tangible memory(ies) of the electronic storage 220 may store other software instructions and data for implementing other operations of the vehicle 100.

The electronic storage 220 may include any suitable volatile and/or non-volatile storage and retrieval device(s), including for example flash memory, random access memory (RAM), read only memory (ROM), hard disk, optical disc, subscriber identity module (SIM) card, memory stick, secure digital (SD) memory card, and other state storage devices. In the example of FIG. 2, the electronic storage 220 of the processing system 200 stores instructions (executable by the processor(s) 210) for implementing the perception system 120 (instructions 120I), the state generator 125 (instructions 125I), the planning system 130 (instructions 130I), and the vehicle control system 140 (instructions 140I). In some embodiments, the electronic storage 220 also stores data 145, including sensor data provided by the sensor system 110, the data about the vehicle and the data about the environment output by the perception system 120 utilized by the planning system 130 to generate at least one of trajectories, and other data such as the map.

FIG. 3 is a block diagram that illustrates further details of the planning system 130.

The planning system 130 may perform planning and decision making operations. As described above, planning and decision making may be performed at three levels, namely at the mission level (e.g., mission planning performed by the mission planner 310), at the behavior level (e.g., behavior planning performed by the behavior planner 320) and at the motion level (e.g., motion planning performed by the motion planner 330). Mission planning is considered to be a higher (or more global) level of planning, motion planning is considered to be a lower (or more localized) level of planning, and behavior planning is considered to be a level between mission planning and motion planning. Generally, the output of planning and decision making operations at a higher level may form at least part of the input for a lower level of planning and decision making.

Generally, the purpose of planning and decision making operations is to determine a path for the vehicle 100 to travel from a first position (e.g., the vehicle's current position and orientation, or an expected future position and orientation) to a target position (e.g., a final destination defined by the user). Planning and decision making operations may also include determining one or more trajectories to one or more intermediate target positions. The planning system 130 determines the appropriate path and trajectories with consideration of conditions such as the drivable ground (e.g., defined roadway), obstacles (e.g., pedestrians and other vehicles), traffic regulations (e.g., obeying traffic signals) and user-defined preferences (e.g., avoidance of toll roads).

Planning and decision making operations performed by the planning system 130 may be dynamic, i.e. they may be repeatedly performed as the environment changes. Thus, for example, the planning system 130 may receive a new vehicle state output by the state generator 125 and repeat the planning and decision making operations to generate a new route or path and new trajectories in response to changes in the environment as reflected in the new vehicle state. Changes in the environment may be due to movement of the vehicle 100 (e.g., vehicle 100 approaches a newly-detected obstacle) as well as due to the dynamic nature of the environment (e.g., moving pedestrians and other moving vehicles).

Planning and decision making operations performed at the mission level (e.g. mission planning performed by the mission planner 310) relate to planning a path for the vehicle 100 at a high, or global, level. The first position of the vehicle 100 (e.g. the current position of the vehicle 100) may be the starting point of the journey (e.g., the user's home) and the target position of the vehicle 100 may be the final destination point (e.g., the user's workplace). Selecting a route or path to travel through a set of roads is an example of mission planning. Generally, the final destination point, once set (e.g., by user input) is unchanging through the duration of the journey. Although the final destination point may be unchanging, the route or path planned by mission planning may change through the duration of the journey. For example, changing traffic conditions may require mission planning to dynamically update the planned path to avoid a congested road. The user may also change the final destination point at any time during the journey.

Input data received by the mission planner 310 for performing mission planning may include, for example, GPS data (e.g., to determine the starting point of the vehicle 100), geographical map data (e.g., road network from an internal or external map database), traffic data (e.g., from an external traffic condition monitoring system), the final destination point (e.g., defined as x- and y-coordinates, or defined as longitude and latitude coordinates), as well as any user-defined preferences (e.g., preference to avoid toll roads).

The planned path generated by mission planning performed by the mission planner 310 and output by the mission planner 310 defines the route to be travelled to reach the final destination point from the starting point. The output may include data defining a set of intermediate target positions (or waypoints) along the path or route. The intermediate target positions may be defined at road intersections to indicate which road to take at each intersection, for example. The intermediate target positions may be used for planning at the behavior level (e.g., a planning and decision making operation (i.e. behavior planning) performed by the behavior planner 320) to decide the appropriate vehicle behavior.

The behavior planner 320 receives the planned route or path from the mission planner 310, including the set of intermediate target positions (if any). The behavior planner 320 also receives the vehicle state output by the state generator 125. The behavior planner 320 generates a behavior decision based on the planned route or path and the vehicle state, in order to control the behavior of the vehicle 100 on a more localized and short-term basis than the mission planner 310. The behavior decision may serve as a target or set of constraints for the motion planner 330. The behavior planner 320 may generate a behavior decision that is in accordance with certain rules or driving preferences. For example, the behavior planner 320 may generate a behavior decision that ensures that the vehicle 100 follows certain behavior rules (e.g., left turns should be made from the left-most lane, vehicle speed should be within a speed limit, vehicle should stop at a stop sign, etc.). Such behavior rules may be based on traffic rules, as well as based on guidance for smooth and efficient driving (e.g., vehicle should take a faster lane if possible). The behavior decision may be output by the behavior planner 320 in a variety of suitable formats. For example, the behavior planner 320 may output the behavior decision in the form of signals (such as a safety signal), scalar values, and/or a cost map (or cost image), among other possibilities. The behavior decision output from the behavior planner 320 may serve as constraints on motion planning, for example.

Motion Planner

The behavior decision is received as input commands to the motion planner 330. For example, the input commands provided to the motion planner 330 (i.e. the behavior decision) may include motion planning constraints. The motion planner 330 should find a trajectory that satisfies the behavior decision, and that navigates the environment in a relatively safe, comfortable, and speedy way. The motion planner 330 should be designed to provide a safe and robust trajectory on both structured and unstructured environments. A structured environment is generally an environment having well-defined drivable and non-drivable areas (e.g., a highway having clear lane markings), and which may have defined driving rules that all vehicles are expected to follow. An unstructured environment is generally an environment in which drivable and non-drivable areas are less defined (or undefined) (e.g., an open field), and which may have fewer or no driving rules for expected vehicle behavior. Regardless of whether the environment is structured or unstructured, the environment may also be highly dynamic (e.g., pedestrians and other vehicles are each moving) and each dynamic obstacle may have different and independent behaviors.

In the example shown in FIG. 3, the motion planner 330 includes a trajectory generator 332, a trajectory evaluator 334, and a trajectory selector 336. The trajectory generator 332 may be implemented using various suitable approaches, for example using expert-designed equations (e.g., polynomial equations) that generate trajectories for the vehicle 100 based on the planned route or path output (e.g., a final destination and/or intermediate target positions) received from the mission planner 330, the behavior decision received from the behavior planner 320 and the current vehicle state received from the state generator 125. In some embodiments, the motion planner 330 may also receive predicted future vehicle states as input.

The trajectory evaluator 334 receives as input information including the current vehicle state, the planned route or path, road network data (e.g., map data), and the candidate trajectories generated by the trajectory generator 332. In some embodiments, the information also includes the predicted future vehicle states. Based on the received information, the trajectory evaluator 334 assigns a set of evaluation values to each candidate trajectory. Among other things, the assigned set of evaluation values may be reflective of whether the candidate trajectory successfully achieves the goal of relatively safe, comfortable and speedy driving (e.g., mobility) within the constraints of the behavior decision, in accordance with various predetermined objectives.

The trajectory selector 336 selects the candidate trajectory with the optimal set of evaluation values (as assigned by the trajectory evaluator 334) among the candidate trajectories generated by the trajectory generator 332. As used herein, the term "trajectory selector" may refer to any functional module that performs trajectory selection to select a desired trajectory based on trajectory evaluation and/or trajectory sorting operations performed by a trajectory evaluator 334. In some examples, the trajectory selector 336 may be implemented as part of the trajectory evaluator 334, as described in greater detail below with reference to example embodiments.

Although the trajectory generator 332, the trajectory evaluator 334 and the trajectory selector 336 are shown and discussed herein as separate blocks (e.g., separate modules, or separate functions) implemented in the motion planner 330, it should be understood that two or more of the trajectory generator 332, trajectory evaluator 334 and trajectory selector 336 may be implemented together in a single block (e.g., within the same module, or same function). Whereas the example embodiments shown in the Figures herein include a trajectory selector 336 implemented as a discrete block, in some embodiments the trajectory selector 336 may be unnecessary or may be trivially implemented as a final operation performed by the trajectory evaluator 334, which may simply select the trajectory sorted to the top of the list of trajectories ordered by, e.g., a desirability metric.

Examples of the trajectory evaluator 334 and trajectory selector 332 will now be described in greater detail.

As disclosed above, the FOV provided by a vehicle's sensor system 110 can be limited, resulting in unobserved regions, for a variety of reasons. For example, inherent features of the sensor system 110 such as sensor range and configuration can result in known FOV blind spots; faults in sensing units of the vehicle's sensor system 110 may result in unexpected FOV blind spots; and the presence of static objects (e.g., foliage, utility poles, signs, bus stops, mail boxes, and other road-side structures) and dynamic objects (e.g., vehicles, pedestrians, cyclists, moving debris) can cause temporary occlusions. In this regard, the present disclosure is directed to a trajectory evaluator 334 and trajectory selector 336 that are configured to consider uncertainties that can result from FOV limitations when evaluating and selecting a planned trajectory from a set of candidate trajectories generated by trajectory generator 332.

In order to mitigate uncertainties that result from FOV limitations, the presently disclosed trajectory evaluator 334 and trajectory selector 336 are configured to enable the planning system 130 to gain information about the upcoming environment in order to minimize the uncertainty caused by FOV limitations. This can, in some scenarios, lead to less conservative motion planning while preserving overall safety. Less conservative motion planning may enable a vehicle to achieve its final objective quicker and more efficiently than more conservative motion planning would permit.

In this regard, trajectory evaluator 334 includes a risk assessment module 338 and an information gain module 340 that are configured to output respective trajectory evaluation values for each candidate trajectory. In particular, the risk assessment module 338 predicts a collision probability score for each candidate trajectory Ti that represents an estimated collision risk associated with following the trajectory for the time interval [0, T], where 0 denotes the start of a current planning horizon interval and T denotes the horizon of the current planning interval. The information gain module 340 estimates an information gain score for each candidate trajectory Ti that represents a predicted information gain for the future planning horizon interval [T, 2T] if the trajectory Ti is followed for the current planning horizon interval [0, T]. To generalize, the interval [0, T] can also be conserved as an interval [t0, t1], where t0 and t1 belong to the intervals (0, T] and (T, 2T], respectively. For the sake of simplicity and ease of following notations, hereafter, in the following disclosure the case of t0=T and t1=2T is considered. However, all equations and descriptions can be extended to consider the more general case of [t0, t1].

Trajectory evaluator may also generate comfort, mobility, and other safety evaluation scores using suitable evaluation methods known in the art.

In some examples, motion planner 330 can also include a failsafe module 346 that is configured to filter out any candidate trajectories generated by trajectory generator 332 that do not meet predetermined safety criteria. In such cases, the candidate trajectories provided to trajectory evaluator 334 for further evaluation is a filtered subset of the generated candidate trajectories that meet the predetermined safety criteria. In example embodiments, the predetermined safety criteria requires that a trajectory must satisfy a condition of belonging to a set of failsafe trajectories $\Omega$. For each trajectory in $\Omega$ there is a failsafe trajectory such that the ego vehicle 100 is collision free at the worst case scenerio. Any candidate trajectories T that do not fall within the safe trajectory set $\Omega$ are rejected. Such filtering may for example be used to remove trajectories that are worst case scenario trajectories, for example trajectories that may result in excessive linear or angular acceleration of the ego vehicle 100. In the event where no safe trajectories are included in the generated set of candidate trajectories, the trajectory selector 336 will be advised to select a safe trajectory from the safe trajectory set $\Omega$, and the generated set of candidate trajectories will be discarded and not evaluated further.

In the case of the candidate trajectories T that fall within the safe trajectory set $\Omega$, the trajectory selector 336 selects, based on the collision probability scores and information gain scores for the filtered set of candidate trajectories output by trajectory evaluator 334, an optimal trajectory that can enable a higher information gain about risky areas (e.g., unobserved regions near the trajectory) while also reducing uncertainty in estimating future collision risks. This may result in a less conservative trajectory selection, resulting in improved vehicle mobility.

By way of illustrative example, in the case where a tall slow-moving truck is directly in front of the ego vehicle 100 (e.g., the vehicle whose motion is being planned by planning system 130), the field of view available to the sensor system 110 of the ego vehicle can be obstructed by the tall slow-moving truck. A conservative approach is to avoid overtaking maneuvers and follow the truck forever due to the high uncertainty in estimating collision risk with the occluded lanes. In contrast, in a non-conservative motion planning, the ego vehicle can perform a small swerve maneuver in order to "peek" around the truck to lower the risk with overtaking and complete the overtaking maneuver if the adjacent lane is free.

Operation of the risk assessment module 338 and information gain module 340 of trajectory evaluator 334 will now be described in greater detail.

Risk Assessment

In examples, the trajectory evaluator 334 is configured to address a problem of an ego vehicle 100 driving in a cluttered environment with unobserved regions that result from an incomplete FOV caused either by limitations of the ego vehicle's sensing units or environmental sensors or by external dynamic or stationary objects that temporally block the FOV of the ego vehicle environmental sensors. In this regard, in the case of a ground based vehicle, the environment E can be considered as a plane that the ego vehicle 100 is travelling in that includes two categories of regions, namely road and non-road regions (e.g., sidewalk and surrounding areas). In addition to the ego vehicle 100, other dynamic actors or agents also operate in the environment E. These dynamic actors or agents may, for example, include multiple classes of dynamic agents that each have different expected operational behavior. For example, one class of dynamic actors or agents can be vehicles (e.g., motor powered vehicles) that are expected to operate on roadway regions within a defined set of rules and constraints that are similar to those of the ego vehicle 100. A second class of dynamic actors or agents can be non-vehicle agents (e.g., pedestrians, animals) that are expected to operate on both roadway and other regions of the environment according to a further set of rules and behavioral constraints that are different than that of the ego vehicle 100. In the present disclosure, the behavior of two distinct classes of dynamic actors or agents are considered and predicted when assessing risk and information gain; however, in further embodiments additional or fewer classes of dynamic actors or agents can be represented and considered (for example, non-vehicle dynamic agents can be broken into pedestrians and cyclists, each represented and modelled using different cell grids).

Thus, in some embodiments, the number of dynamic actor classes may vary depending on the freedom of motion. For example, one class can be considered for objects whose motions are constrained by the road network such as vehicles, another class for objects with no restriction such as pedestrians, and another class for objects with semi-constrained motion such as bicycles.

In some embodiments, the number of object classes can reduce to a single class containing all possible objects. In this case, the corresponding grid is generated based on each object manoeuvrability.

In an example embodiment, trajectory evaluator 334 receives the following set of inputs: (1) a set of candidate trajectories $T=\{\Im_1, \ldots, \Im_n\}$ for ego vehicle 100 as generated by trajectory generator 332, with each candidate trajectory $T_i$ corresponding to a planning horizon T that includes a set of time steps s (i.e., each trajectory in set T corresponds to a time interval [0, T], where $s\in[0, T]$) (as noted above in some examples, the set of candidate trajectories $T=\{\Im_1, \ldots, \Im_n\}$ may be a filtered set of trajectories that fall within safe trajectory set $\Omega$); each trajectory will have the same starting position at time 0 and a respective ending position at a horizon time T; (2) a current ego vehicle state $q^t$ at a given time t (in example embodiments, the initial ego vehicle state $q^{t=0}$ is the observed vehicle state at the start of interval [0, T], as generated by perception system 120); and (3) road network data.

Figure 4:
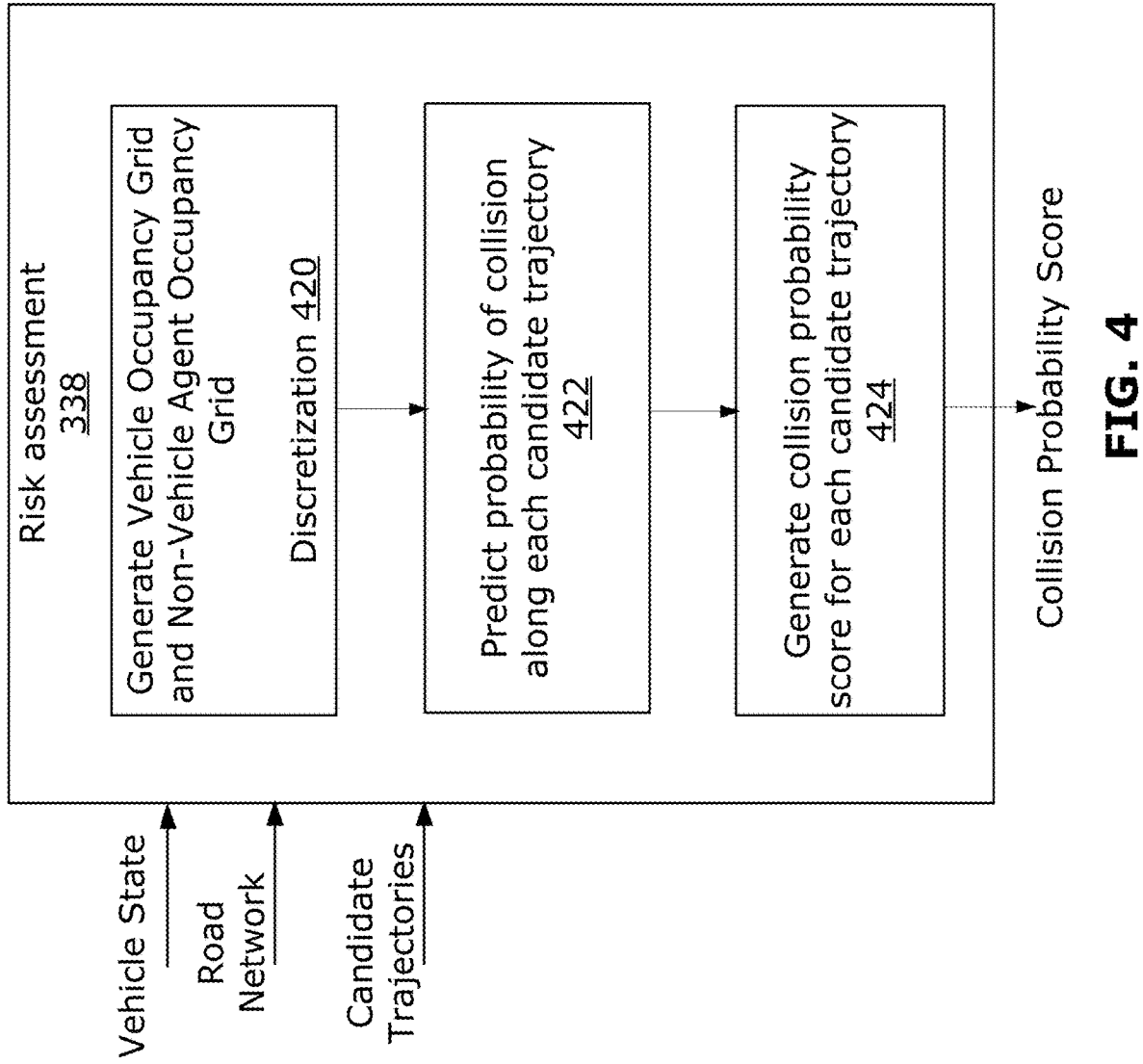
FIG. 4 is a flow diagram of a method for generating a collision probability score for a candidate trajectory.

FIG. 4 shows an example of a method that can be performed by risk assessment module 338 to predict a collision probability score for each candidate trajectory $T_i$. The risk assessment module 338 receives, as input, an initial ego vehicle state $q^{t=0}$ (i.e., ego vehicle state as determined by the state generator 125 based on measurements made by sensor system 110 at the start of interval [0, T] that corresponds to candidate trajectory $T_i$).

As indicated in Discretization block 420, an initial operation performed by risk assessment module 338 when evaluating a candidate trajectory $T_i$ is to acquire one or more initial occupancy grids that represent the environment E of the ego vehicle 100 at the start of interval [0, T]. In example embodiments, trajectory evaluator 334 includes an occupancy grid generator 342 that can generate discretized representations of the environment E of the ego vehicle 100 for use by risk assessment module 338 and information gain module 340.

Figure 5:
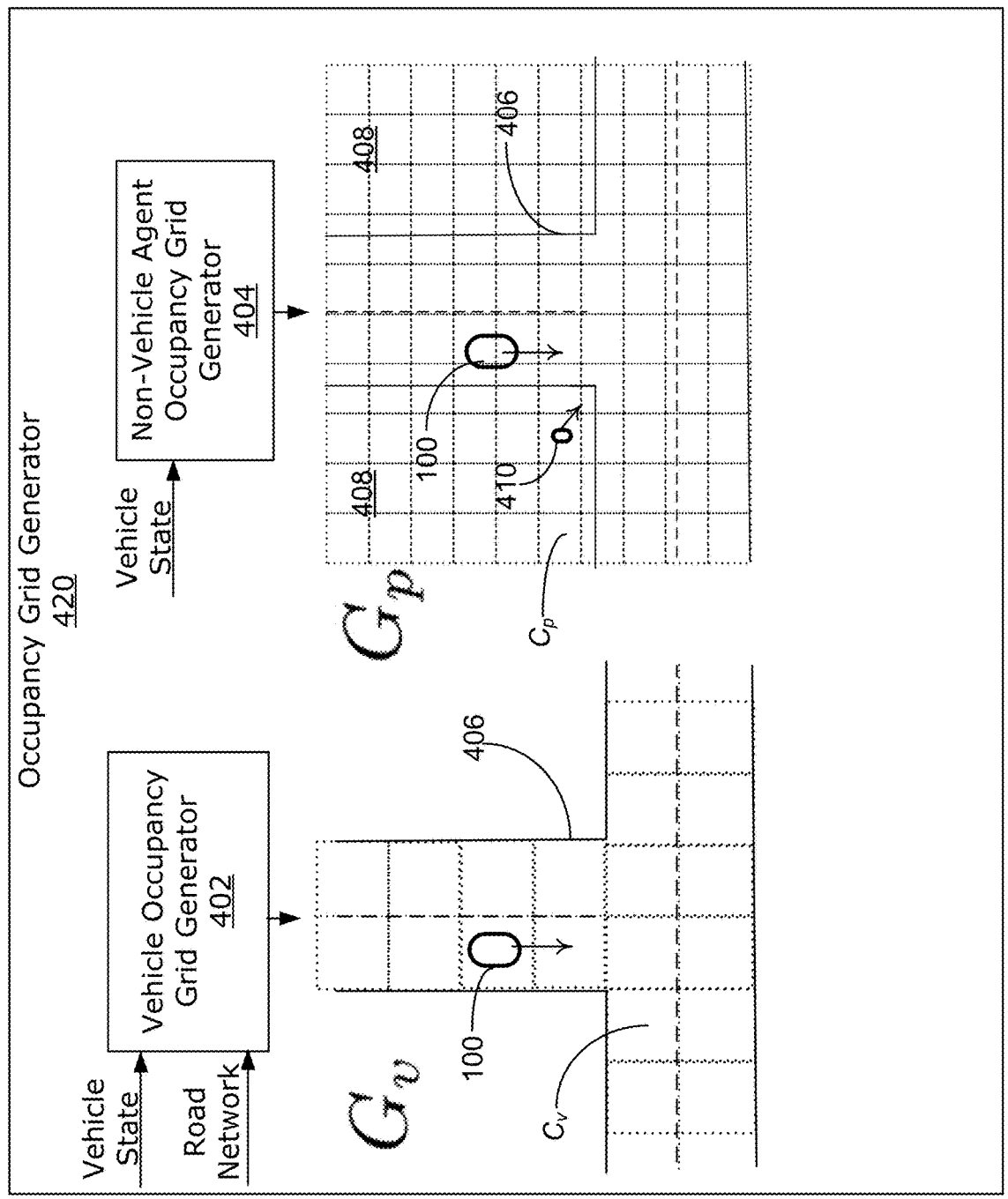
FIG. 5 is a block diagram of an occupancy grid generator of the planning system.

Referring to FIG. 5, in the illustrated example, occupancy grid generator 342 is configured to generate two probabilistic model representations of the environment E of the ego vehicle 100 (e.g. the environment the ego vehicle 100 is operating in) at each time step s based on currently observed ego vehicle state $q^t$ and on historic information, including previously observed vehicle states. These probabilistic models are: (i) a vehicle occupancy grid $G_v$ generated by vehicle occupancy grid generator 402 and (ii) a non-vehicle agent occupancy grid $G_p$ generated by a non-vehicle agent occupancy grid generator 404.

Vehicle occupancy grid $G_v$ represents regions of the environment E where the ego vehicle 100 and other vehicles are expected to travel (i.e., road regions), and thus can be restricted to the actual roadway 406. In this regard, based on data included in the road network data (e.g., a road map) and ego vehicle state $q^t$, the vehicle occupancy grid generator 402 is configured to generate vehicle occupancy grid $G_v$ as a set of cells $c_v$ along the center lines of roadways within environment E of the ego vehicle 100. Each cells $c_v$ in the set of cells maps to a respective physical region of the roadway 406 and may, for example, have a defined length corresponding to a defined vehicle length and a width corresponding to a lane width of the roadway 406.

Among other things, ego vehicle state $q^t$ includes state information (e.g., location, velocity, acceleration) about both the ego vehicle 100 and other vehicles that are observed by the ego vehicle's sensor system 110. This state information about the observed environment is used to populate the cells $c_v$ of vehicle occupancy grid $G_v$ with random variables that represent respective cell states. For example the random variable could be a probability value from "0" to "1", with a "0" indicating that at time 0, the cell state is "empty or free" and a "1" indicating the cell state is "occupied" by an object other than the ego vehicle 100. A "0.5" value can indicate a maximum uncertainty as to whether a cell is occupied or unoccupied. In example embodiments, FOV limitations can cause at least some of the regions that correspond to cells $c_v$ to be obstructed at a given time (e.g., a region may be occluded from ego vehicle's sensor system 110 by a stationary or dynamic obstacle or may be in a blind spot of the sensor system 110). In such cases, the cell state is uncertain and cannot be directly determined from the ego vehicle state $q^t$. The output of vehicle occupancy grid generator 402 is an observed grid state $O_v^t$ (e.g., a tensor that includes a set of observed cell states) corresponding to time t=0. Cells that are observed at time t=0 as being empty are assigned a cell state $c^0$="O"; Cells that are observed at time t=0 as being occupied are assigned a cell state $c^0$="1"; Cells that are unobserved at time t=0 as are assigned a cell state $c^0$="0.5", indicating a maximum state of uncertainty. In some embodiments, a value between 0 to 1 can be assigned to unobserved cells, depending on the level of conservativeness of the planning system, where 0 and 1 result in the least and the most conservative planning, respectively.

The non-vehicle agent occupancy grid generator 404 is configured to generate non-vehicle agent occupancy grid $G_p$ as a set of grid cells $c_p$ that map to respective regions in environment E of the ego vehicle 100. Non-vehicle agent occupancy grid $G_p$ is intended to represent dynamic non-vehicle agents (i.e. dynamic objects which are not vehicles) in the ego vehicle environment E that have different movement constraints and properties than vehicles, such as pedestrians 410. For example pedestrians 410 are non-vehicle agents that are expected to have a different nominal speed than a vehicle, but have a wider range of expected movement within the environment as pedestrians are not subject to directional road rules and are expected to traverse non-roadway regions 408 of the environment in addition to the roadway 406. Non-vehicle agent occupancy grid generator 404 can generate a non-vehicle agent occupancy grid $G_p$ that is a simple discretization of both the roadway 406 and adjacent non-roadway regions 408 (e.g., both non-road regions and road regions) of the environment E, represented as a set of equal sized cells $c_p$. Similar to the case of vehicle occupancy grid $G_v$, each grid cell of non-vehicle agent occupancy grid $G_p$ is populated with a variable value from "0" to "1", with a "0" indicating that the cell state is confirmed to be "empty or free" of a non-vehicle dynamic agent and a "1" indicating that the cell state is "occupied" As in the case of vehicle occupancy grid, FOV limitations can result in unobserved regions for which the cell state is uncertain and cannot be directly determined from the ego vehicle state $q^t$. The output of non-vehicle agent occupancy grid generator 404 is the observed grid state $O_p^{\ t}$ (e.g., a tensor that includes a set of observed cell state) corresponding to time t=0. Cells that are observed at time t=0 as being empty are assigned a cell state $c^0$="0"; Cells that are observed at time t=0 as being occupied are assigned a cell state $c^0$="1"; Cells that are unobserved at time t=0 as are assigned a cell state $c^0$="0.5", indicating a maximum state of uncertainty. In some embodiments, a value between 0 to 1 can be assigned to unobserved cells, depending on the level of conservativeness of the planning system, where 0 and 1 result in the least and the most conservative planning, respectively.

In the illustrated example, non-vehicle agent occupancy grid $G_p$ covers an area that is larger than and overlaps the area of vehicle occupancy grid $G_v$. The grid cells of non-vehicle agent occupancy grid $G_p$ can be a different size (for example smaller) than the grid cells of vehicle occupancy grid $G_v$. The use of different occupancy grids for different types of dynamic agents can enable the motion planner 330 to make predictions based on the constraints and properties of different categories of dynamic agents.

The observed grid state $O^t=O_v^{\ t}\cup O_p^{\ t}$ that is generated and provided to risk assessment module 338 will be the same for all candidate trajectories T={$\mathscr{T}_1, \ldots, \mathscr{T}_n$} at time t=0. Trajectory evaluation is an iterative process that is repeatedly performed, such that risk assessment module 338 will also have access to historic observed grid states, and in this regard the sets of observed grid states until the current observed grid state $O^t=O_v^{\ t}\cup O_p^{\ t}$ is denoted as $O^{t-}=O_v^{\ t-}\cup O_p^{\ t-}$. For the case of t=0, the observed grid state prior to a current observed grid state $O^0=O_v^{\ 0}\cup O_p^{\ 0}$ is denoted as $O^{0-}=O_v^{\ 0-}\cup O_p^{\ 0-}$.

For notational simplicity, in this disclosure, the notation c without any subscripts will be used to generically denote cells of both vehicle occupancy grid $G_v$ and non-vehicle agent occupancy grid $G_p$, and the notation $c^t$ is used to denote the corresponding occupancy probability random variable at time t, where C denotes the set of all random variables $c^t$, where $c \in G_v \cup G_v$.

In example embodiments, operation of the risk assessment module 338 is based on the following premise, where $O^{t-}$ is the set of observed grid states until the current time t, the probability that a cell c in the set of observed grid states is occupied at time t is denoted as $P(c^t|O^{t-})$. Given a new observed grid state $O^t$, the probability of occupancy for a cell $c \in G_v \cup G_v$ for all cells $c \in O^t$ can be updated as follows:

$$P(c^t = 1 \mid O^{t-} \cup O^t, c \in O^t) = \frac{P(O^t \mid c^t = 1)P(c^t = 1 \mid O^{t-})}{P(O^t \mid c^t = 1)P(c^t = 1 \mid O^{t-}) + P(O^t \mid c^t = 0)P(c^t = 0 \mid O^{t-})},$$

where $P(c^t=1|O^{t-})$ is the prior, $P(O^t|c^t=1)$ represents the error in identifying the occupancy of a cell. For the cells that are not visible in the observed grid state $O^t$, the probability of such unobserved cells being occupied is increased as a function of the number of time steps since the cell was last observed. For example, for unobserved cells, probabilities can be updated as follows:

$$P(c^t = 1 \mid O^t, c \notin O^t) = P(c^t = 1 \mid O^{t-}) + \left(\frac{1}{2} - P(c^t = 1 \mid O^{t-})\right)\exp\left(-\frac{1}{k}\right),$$

where k is number of time steps since the last observation on the cell c (i.e., the variable k indicates how many time steps have passed since the cell c was directly observed by the vehicle's sensor system 110, as reflected in the observed grid state $O^t$ and previous time step grid states).

Note that the probability of the occupancy for a cell c converges to 0.5 after it is not observed for a consecutive number of time steps, which represents the highest possible uncertainty for the state of a cell. As an initial default, the probabilities of occupancy for cells can be initialized with 0.5 to represent their unknown states. The above equation for determining the probability for an unobserved cell is one example of a possible calculation. Other calculations wherein probability is a continuous function of the number of time steps since the last observation, with a maximum at 0.5, could alternatively be used.

The variable $q^T$ can denote the state of the ego vehicle 100, at time t, the variable T can denote the planning horizon, and a trajectory $\mathscr{T}^{s,e}=\langle q^s, \ldots, q^e \rangle$ is a sequence of states of the ego vehicle 100 between [s,e]. The collision of a dynamic agent occupying cell c simultaneously with the ego vehicle 100 at $q^t$ with $I(c|q^t)$, where $I(c|q^t)=1$ if there is a collision and $I(c|q^t)=0$ otherwise. Binary random variable $E(\mathscr{T}^{s,e})$ can be used to denote a collision between the ego vehicle 100 and a dynamic agent while ego vehicle 100 travels along trajectory T, where $E(\mathscr{T}^{s,e})=1$ corresponds to a collision, i.e.

$$E(\mathscr{T}^{s,e})=\max\{c^t \in C | I(c,q^t)=1, t \in [s,e]\}.$$

The random variable $E(\mathscr{T}^{s,e})=1$ if there is a cell c that has a state $c^t=1$ (i.e., occupied state) at time t, such that $I(c|q^t)=1$, representing collision with an agent while executing trajectory $\mathscr{T}^{s,e}$.

Thus, the probability of collision for a trajectory T in the time horizon from [0, T] given the observations till the current time is defined as follows:

$$\mathbb{E}(E(\mathscr{T}^{0,T}) \mid O^{0-}) =$$

$$1 - \mathbb{P}(E(\mathscr{T}^{0,T}) = 0 \mid O^{0-}) = 1 - \prod_{c \in G_p \cup G_v} \prod_{t=0}^{T} \mathbb{P}(c^t = 0 \mid O^{0-})I(c, q^t),$$

Equation (1)

where the expected value of $E(\mathscr{T}^{s,e}|O)$ represents the probability of collisions given an observation O and is denoted by $\mathbb{E}(E(\mathscr{T}^{s,e})|O)$, and the second equality is based on an assumption that the random variables for cell occupancy are independent of each other. Equation (1) represents the expected risk of collision for the trajectory from time 0 to T. The probability of collision of a trajectory is the probability that at least one of the cells occupied by the trajectory at different time steps is occupied. In other words, the probability of a trajectory being collision free is the probability that the cells overlapping a state in the trajectory are non-zero. The probabilistic measure of risk shows the probability of a collision along a trajectory. Although the risk probability is an important measure to minimize the probability of collision, it does not ensure a collision free trajectory, hence the inclusion of failsafe module 346 in examples. A safe region at time s, denoted by SR(t), can be considered to be the set of all configurations $q^t$ of the ego vehicle at time t such that there exists a trajectory $\mathcal{T}^{t,T}$ starting at $q^t$ and $\mathbb{E}(E(\mathcal{T}^{t,T}))=0$. The safe set of trajectories, $\Omega$, can represent the set of all trajectories $\mathcal{T}^{0,T}=\langle q^0, q^1, \ldots, q^T \rangle$ such that $q^1 \in SR(1)$. Thus, safe trajectory set $\Omega$ represents the set of all trajectories that after a step of executing a trajectory in set $\Omega$, there is always a safe trajectory that will avoid collisions in the worst-case scenario.

Based on the above premise, with reference again to FIG. 4, as indicated at block 422, risk assessment module 338 is configured to predict a probability of the ego vehicle 100 colliding with another vehicle or a non-vehicle dynamic agent for candidate trajectory $T_i$. In order to do so, risk assessment module 338 is configured to predict, for each of a plurality of future times t (each time t corresponding to a time step in planning interval [0, T]) a collision probability for the ego vehicle 100 following the candidate trajectory $T_i$. This probability is based on predicting: (i) whether another vehicle will be located in the same grid cell in vehicle occupancy grid $G_v$ as the ego vehicle 100 at a future time t, and (ii) whether a non-vehicle agent will be located in the same grid cell in non-vehicle agent occupancy grid $G_p$ as the ego vehicle 100 at future time t.

As indicated above, these predictions are determined by determining if a grid cell that the ego vehicle is predicted to be in at a time t is reachable by other vehicle/non-vehicle agents by time t. This determination is performed based on the observed cell set $O^t = O_v^t \cup O_p^t$ for t=0 and the historic observed cell sets $O^- = O_v^- \cup O_p^-$, as described below.

Risk assessment module 338 predicts the state of the environment, as represented by the occupancy grid, in future time steps over the time interval [0, T]. The probability of a subject agent (i.e., a third party vehicle in the case of grid $G_v$, and non-vehicle dynamic agent in the case of grid $G_p$) occupying grid cell $c_i$ at time s within a time horizon t can be denoted as $P(c_i^s | c_j^t)$. The probability $P(c_i^s | c_j^t)$ is proportional to a nominal velocity of the subject agent, the distance between grid cells $c_i$ and $c_j$, and the duration of time interval [s, t]. A set of all cells $c_i$ for which the probability $P(c_i^s|c_j^t)>0$ is the reachable set for a cell $c_j$ within time interval [s, t], and can be denoted as $RS(c_j, s, t)$. Accordingly, the reachable set $RS(c_j, s, t)$ denotes the set of starting cells $c_i$ that, given a destination cell $c_j$ (e.g., cell that the ego vehicle 100 is expected to be located in at time t according to trajectory that is being evaluated), a third party vehicle or non-vehicle dynamic agent can occupy at the start of time interval [s, t] and still have a non-zero probability of reaching the destination cell $c_j$.

In the case of vehicle occupancy grid $G_v$, the movement of vehicles is directionally governed by the road network. The future states of vehicles within the environment E is estimated based on the grid cell locations that they can occupy in vehicle occupancy grid $G_v$. Although examples are described herein in the context of grids in which cells corresponds to road locations, a graph structure could also be used to represent occupancy state, with nodes or vertexes of the graph corresponding to cells of the grid. For example, Grid $G_v$ can be considered as a graph $G=(V,E)$ where V denotes a set of vertices or nodes and E denotes a set of directional edges that indicate connections between respective pairs of vertices in set V. Each cell c in grid $G_v$ is represented by a corresponding vertex of node in set V, and there is an edge in set E between vertices u, w∈V for each case where the corresponding cells $c_u, c_w$ are neighbors (i.e. adjacent each other). The direction of edges between vertices u, w corresponds to the normal direction of travel on the roadway between the cells $c_u, c_w$.

The reachable set $RS(c_j, s, t)$ for given cell $c_j$ corresponds to the set of vertices of graph G from which the vertex that corresponds to cell $c_j$ can be reached using directional edges in the set E within the time interval [s, t]. In example embodiments, the reachable set $RS(c_j, s, t)$ for given cell $c_j$ is determined by applying a known Depth First Search (DFS) algorithm.

For example, a probability that a cell $c \in G_v$ is occupied at a time t can be predicted as follows:

$$\mathbb{P}(c^t=1|O^{0-} \cup O^0) = \Pi_{c_i \in G_v}[\mathbb{P}(c_i^0=0|O^{0-}\cup O^0) + (1-\mathbb{P}(c_i^0,c^t))\mathbb{P}(c_i^0=1|O^{0-}\cup O^0)] =$$
$$\Pi_{c_i \in G_v}[1-\mathbb{P}(c_i^0,c^t)\mathbb{P}(c_i^0=1|O^{0-}\cup O^0)], \quad \text{Equation (2)}$$

Where:
- $c^t$ denotes the predicted state (e.g.: 1=occupied; 0.5=maximum uncertainty 0=unoccupied) of the cell c at a horizon time t in interval [s=0, t];
- $O^0$ denotes the set of observed states of the cells c of the grid $G_v$ at time s=0;
- $O^{0-}$ denotes the set of observed states of the cells c of the grid $G_v$ at the last observed time preceding time s=0;
- $c_i^0$ denotes the state of the cell $c_i$ at an interval start time s=0; and
- $\mathbb{P}(c_i^0, c^t)$ is the probability that a vehicle at $c_i$ at time zero moves to c at time t.

Equation 2 shows the probability that cell c is unoccupied by a vehicle agent at time t given observation until time 0. A cell c is occupied at time t if a vehicle agent from a cell $c_i$ at time 0 moves to c and occupies it at time t. The individual probabilities determined using Equation 2 can be combined for a candidate trajectory $T_i$ using equation (1) to arrive at a vehicle grid collision probability score for candidate trajectory $T_i$.

Non-vehicle agent occupancy grid $G_p$, can also be considered as a graph G=(V, E), however the movement of non-vehicle dynamic agents (e.g., pedestrians) is not directionally governed by the roadway restrictions, thus connecting edges can bi-directional. The reachable set $RS(c_i, s, t)$ for given cell $c_i \in G_p$ at time s is the set of all cells within a distance of cell $c_i$ that a non-vehicle agent can travel within the time interval [s, t].

For example, a probability that a cell $c \in G_p$ is occupied at a time t can be predicted as follows:

$$\mathbb{P}(c^t=1|O^{0-}\cup O^0) = \Pi_{c_i \in G_p}[1-\mathbb{P}(c_i^0,c^t)\mathbb{P}(c_i^0=1|O^{0-}\cup O^0)], \quad \text{Equation (3)}$$

where:
- $c^t$ denotes the predicted state (e.g.: 1=occupied; 0.5=maximum uncertainty; 0=unoccupied) of the cell c at a horizon time t in interval [s=0, t];
- $O^0$ denotes the set of observed states of the cells c of the grid $G_v$ at time s=0;
- $O^{0-}$ denotes the set of observed states of the cells c of the grid $G_v$ at the last observed time preceding time s=0;
- $c_i^0$ denotes the state of the cell $c_i$ at an interval start time s=0; and $\mathbb{P}(c_i^0, c^t)$ is the probability that a pedestrian at $c_i$ at time zero moves to c at time t.

Equation (3) shows the probability that cell c is unoccupied by a non-vehicle agent at time t given observation until time 0. A cell c is occupied at time t if a dynamic non-vehicle agent from a cell $c_i$ at time 0 moves to c and occupies it at time t.

The individual probabilities determined using Equation (3) can be combined for a candidate trajectory $T_i$ using Equation (1) to arrive at a non-vehicle agent grid collision probability score for candidate trajectory $T_i$.

Accordingly, risk assessment module 338 is configured to predict probabilities that the ego vehicle 110 can follow the candidate trajectory $T_i$ over planning interval [0, T] without simultaneously occupying a grid cell in vehicle occupancy grid $G_v$ with a further vehicle or a grid cell in non-vehicle agent occupancy grid $G_p$ with non-vehicle agent. As indicated at block 424, the risk assessment module 338 may apply a function that takes the vehicle grid collision probability score and non-vehicle agent grid collision probability score as inputs and returns an overall collision probability score for the candidate trajectory $T_i$. By way of example, the function could be a linear combination of the two collision probability scores.

Information gain module 340 is configured to estimate the future information gains each of the trajectories in the set of candidate trajectories $T=\{\mathcal{T}_1, \ldots, \mathcal{T}_n\}$ can provide. For example, if a particular candidate trajectory will enable the sensor system 110 to collect more information about currently unobserved regions within the environment than other candidate trajectories, then that candidate trajectory will have a relatively higher information gain score.

Information Gain

In example embodiments, the operation of the information gain module 340 is based on the following premise. The ego vehicle 100 measures observations through sensor system 110 about its environment while executing a trajectory $\mathcal{T}^{0,T}$. These sensor system measurements are used by the perception system 120 to generate an ongoing series of observed vehicle states, improve the understanding about the risks of collision in future. It will noted that the observations gathered on the environment depends on the trajectory of the ego vehicle 100 in the time horizon [0, T]. Given the observations on the state of the environment $O^s \cup O^\delta$ collected till time s, the probability of collision for the future time horizon [δ,δ+T] for δs, is:

$$\mathbb{E}(E(\mathcal{T}^{\delta,\delta+T})|O^{s-}\cup O^s)=1-\Pi_{c\in G_p\cup G_v}$$
$$\Pi_{t=\delta}^{\delta+T}\mathbb{P}(c^t=0\cup O^s)I(c,q^t).$$

The Shannon entropy, $\mathcal{H}(E(\mathcal{T}^{\delta,\delta+T})|O)$ is a measure of the uncertainty of a random variable, i.e., $$-\sum_{i\in\{0,1\}}\mathbb{P}(E(\mathcal{T}^{\delta,\delta+T})=i\mid O)\log(\mathbb{P}(E(\mathcal{T}^{\delta,\delta+T})=i)\mid O).$$

The change in Shannon entropy with observations until time s represents the information gain on the random variable, i.e., $$\Delta\mathcal{H}_{(E(\mathcal{T}^{\delta,\delta+T}),s)}=\mathcal{H}_{(E(\mathcal{T}^{\delta,\delta+T})|O^{s-}\cup O^s)}-\mathcal{H}_{(E(\mathcal{T}^{\delta,\delta+T})|O^{0-})}.$$

Equation (4)

The later that observations occur in the current time horizon, the better estimate of the probabilities of occupancy in the future time horizon. However, early observations allows the ego vehicle 100 to adjust its trajectory and minimize the risk of collision. Thus, in example embodiments, a total change in the uncertainty of $E(\mathcal{T}^{\delta,\delta+T})$ is considered together with a linear combination of the information gain at different time steps, i.e., $$\Delta\mathcal{H}_{(E(\mathcal{T}^{\delta,\delta+T}))}=\Sigma_{s=0}^T w_s \Delta\mathcal{H}(\mathcal{T}^{\delta,\delta+T},s),$$

where $w_s$ is a pre-defined weight that represents the importance of making observations at different time steps.

A deviation from a nominal trajectory $\mathcal{T}_{nom}$ can be denoted by $J(\mathcal{T}_{nom}, \mathcal{T})$. In some examples, the deviation can be represented as the distance between the two trajectories, i.e., $$J(\mathcal{T}_{nom}, \mathcal{T}) = \sum_{t\in(T)} \|q^t - q^t_{nom}\|_2^2.$$

Given a trajectory $\mathcal{T}_m\langle q^0, \ldots, q^T\rangle$ the final state $q^T$ of the ego vehicle 100 at the current time horizon is the initial state for the next time horizon. A quality value $J(\mathcal{T})$ can be used to evaluate the quality of the initial state of the future time horizon. In one example, the quality value $J(\mathcal{T})$ is represented as the length of the shortest trajectory from state $q^T$ converging to the nominal trajectory of the future time horizon.

Given a set of candidate trajectories in $\Omega$, and a nominal trajectory, the following objective can be evaluated for all $\mathcal{T} \in \Omega$:

$$J(\mathcal{T}^{0,NT}, \mathcal{T}_{nom}) + \sum_{i=0}^N \rho_i \mathbb{E}(E(\mathcal{T}^{iT,(i+1)T}) \mid O^{iT-}) - \beta\Delta\mathcal{H}(\mathcal{T}^{0,NT}),$$

where β≥0 is a pre-defined parameter representing the importance of information gain for future planning horizons.

Thus, the information gain on the risk of collision for future time period [T, 2T] relies on the observation that the ego vehicle makes in the current time period [0, T]. However, observations on different cells are not independent of each other, therefore, calculating the information gain (see Equation (4)) at each time step for all possible outcomes of observations is intractable. Therefore, in example embodiments, estimations are used to determine information gain. Note that the probabilities of safe trajectory in the future time step [T, 2T] with observation until time s∈[0, T] is as follows:

$$\mathbb{P}(E(\mathcal{T}^{T,2T})=1\mid O^{s-}\cup O^s)=1-\prod_{c_i\in G_p\cup G_v}\prod_{t=T}^{2T}\mathbb{P}(c_i^t=0\mid O^{s-}\cup O^s)I(c_i,q^t),$$

where:

$$\mathbb{P}(c_i^t = 0 \mid O^{t-} \cup O^s) =$$
$$\prod_{c_j\in G_p\cup G_v}\left[\mathbb{P}(c_j^s = 0 \mid O^{s-}\cup O^s) + (1-\mathbb{P}(c_i^t\mid c_j^s))\mathbb{P}(c_j^s=1\mid O^{s-}\cup O^s)\right]$$
$$= \prod_{c_j\in G_p\cup G_v}\left[1-\mathbb{P}(c_i^t\mid c_j^s)\mathbb{P}(c_j^s=1\mid O^{s-}\cup O^s)\right].$$

The computation of information gain on a cell $c_i^t$ at time t given an observation on cell $c_j^s$ at time s can be simplified by assuming that the probabilities for the cells are independent and the probability of observation of a cell is independent of probability of observations of other cells.

Figure 6:
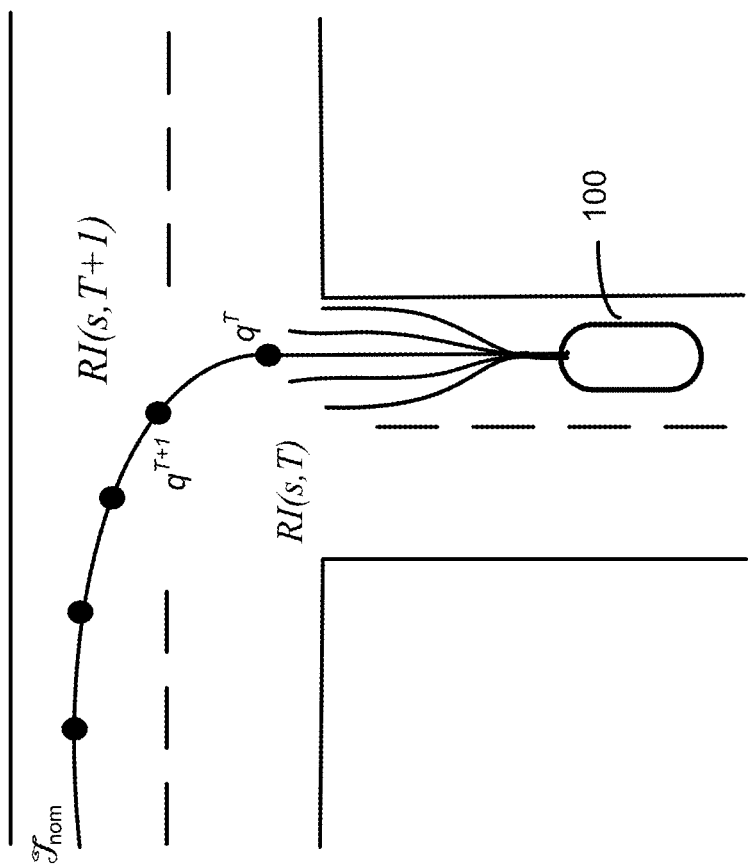
FIG. 6 graphically illustrates a region of interest for an ego vehicle at time s.

With reference to FIG. 6, in example embodiments the analysis of information gain is limited to trajectories that fall within a region of interest (RI). FIG. 6 illustrates a plurality of trajectories for RI (s, T) corresponding to vehicle state $q^T$. A nominal trajectory $T_{nom}$ corresponding to future time period [T, 2T] for ego vehicle 100 is also shown. Given a trajectory $T^{T, 2T}$, the region of interest RI(s, t), at time s∈[0, T], is a subset of the environment that for an agent at a location c, the reachable set of the agent within time interval [s, t] coincides with the ego vehicle state $q^t$, namely:

$$RI(s,t) = \{c_i \in G_p \cup G_v | \exists c_j \in RS(c_i,s,t), I(c_j,q^t)=1\}.$$

Observing cells at time s with higher entropy carries more information on the state of the cells located along the trajectory in the future time period [T, 2T]. For the case where the region of interest $RI(s) = \cup_{t=T}^{2T} RI(s, t)$ at time s the information gain for a candidate trajectory in time period [0, T] for the future time period [T, 2T] can be approximated as follows:

$$\mathcal{H}(E(\mathcal{T}^{T,2T}) | O^{0-}) - \mathcal{H}(E(\mathcal{T}^{T,2T}) | O^{s-} \cup O^s) = \quad \text{Equation (5)}$$
$$\mathcal{H}(E(\mathcal{T}^{T,2T}) | O^{0-}) - \sum_{c_j \in RI(s)} \mathcal{H}(c_j^s | O^{s-} \cup O^s).$$

To minimize the computational cost of finding the region of interest for each candidate trajectory in time period [0, T], in some examples, only the information gain for the cells in the region of interest of the nominal trajectory $T_{nom}$ are computed.

The computation of Equation (5) is an approximation that can alleviate computation time required by the information gain module 340. In other embodiments, different calculations could be used to compute information gain.

Figure 7:
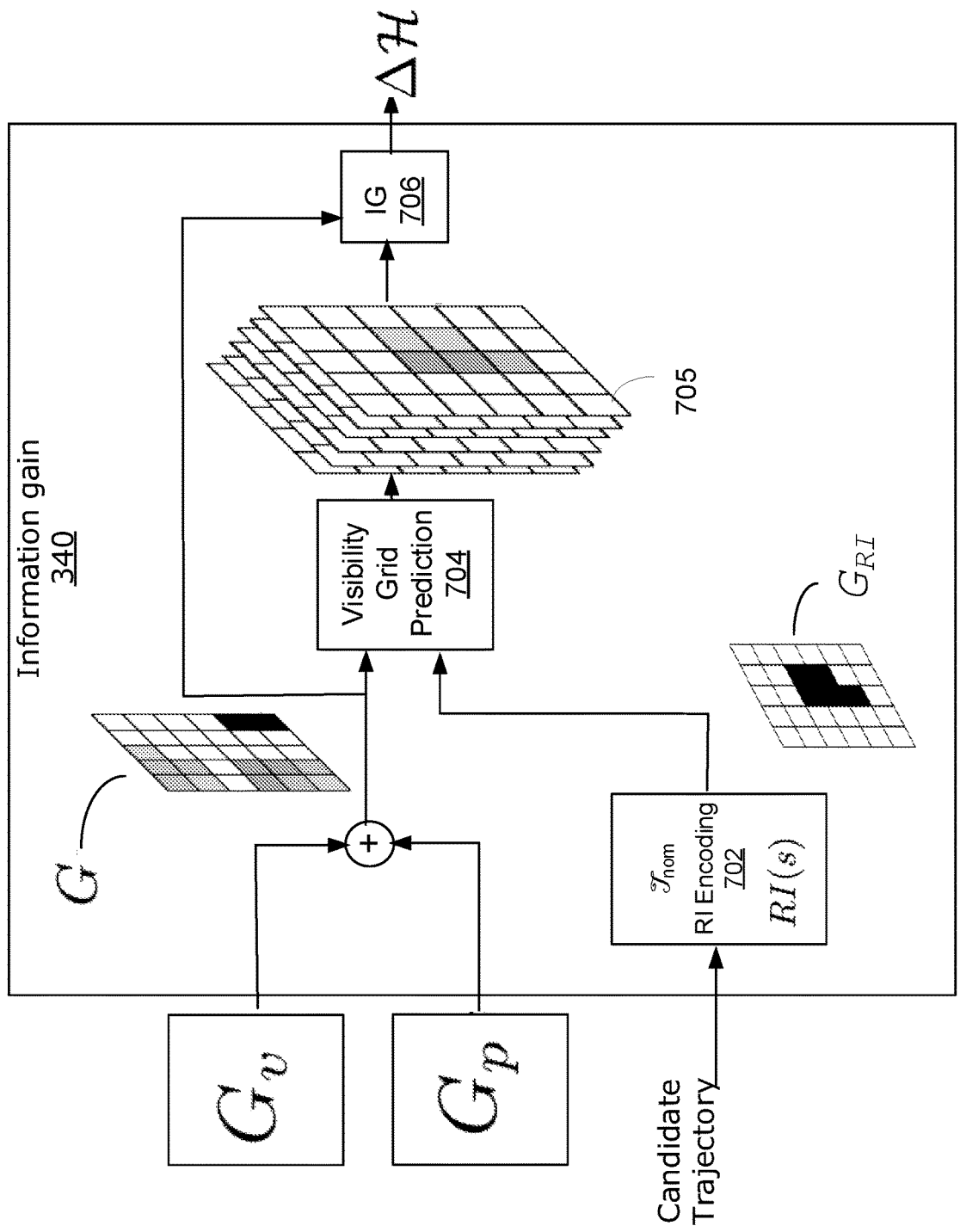
FIG. 7 is a block diagram of an Information Gain module of the planning system.

FIG. 7 illustrates an example of information gain module 340 for computing the information gain for future time period [T, 2T] based on vehicle state observations made during time steps $s \in [0, T]$. As indicated in FIG. 7, information gain module 340 receives as inputs: the set of candidate trajectories $T = \{\mathcal{T}_1, \ldots, \mathcal{T}_n\}$ for the time horizon T; and the vehicle occupancy grid $G_v$ and non-vehicle agent $\mathcal{T}$ occupancy grid $G_p$, generated by occupancy grid generator 420 in respect of the set of candidate trajectories $T = \{\mathcal{T}_1, \ldots, \mathcal{T}_n\}$.

In the illustrated example, the vehicle occupancy grid $G_v$ and non-vehicle agent occupancy grid $G_p$ are unified to provide a unified occupancy grid G by mapping locations in the vehicle occupancy grid $G_v$ to locations in the non-vehicle agent occupancy grid $G_p$. Further, a candidate vehicle trajectory for the current time horizon interval [0, T] is encoded at an RI encoding operation 702 to generate: (1) a nominal trajectory $T_{nom}$ for future time horizon interval [T, 2T] (as suggested above, each candidate vehicle trajectory in the current time horizon will have multiple candidate vehicle trajectory in the future time horizon, and accordingly a nominal trajectory is generated to represent all of the multiple candidate vehicle trajectories in order to simplify computing requirements); and (2) a region of interest grid $G_{RI}$ having a cell topology that corresponds to the unified occupancy grid G and represents grid cells in the current time horizon, at current time step s, that are of interest given the future nominal trajectory $T_{nom}$. In the region of interest grid $G_{RI}$, the cells that the motion planner 330 should observe are set to 1, and 0 otherwise. The unified occupancy grid G and RI grid $G_{RI}$ are provided as inputs to a visibility grid prediction function 704 that is configured to generate a set of visibility grids 705 that each represent the visibility of ego vehicle with a respective lateral deviation of the nominal trajectory $T_{nom}$ from the ego vehicle state $q^s$. The set of visibility grids 705 and the unified occupancy grid G are then provided to an information gain function IG 706 that calculates an information gain score $\Delta \mathcal{H}$ for the candidate trajectory, as per equation (5).

In example embodiments, visibility grid prediction function 704 is implemented using a convolutional neural network that has been trained using supervised training.

Operation of the motion planner 330 can be summaries as follow. As the ego vehicle 100 travels along a roadway, sets of candidate trajectories are continuously being generated by trajectory generator 332. For example, a set of candidate trajectories can be generated in each time step for a planning horizon interval [0, T] that covers multiple future time steps. For each trajectory T in Ω there is a failsafe trajectory such that the vehicle is collision free at the worst case scenario The candidate trajectories that fall within failsafe trajectory set Ω for the planning horizon interval [0, T] are passed to trajectory evaluator 334. Thus, only trajectories that satisfy the condition of having a failsafe trajectory are considered further.

Risk assessment module 338 computes, based on historic vehicle states and the current vehicle state as observed at the current time step, a respective collision probability scores for each of the candidate trajectories in the set T. In example embodiments, the historic vehicle state data and the current vehicle state is represented in occupancy grids $G_v$, $G_p$ that embed both prior vehicle state and current vehicle state information in the form of grid cell variables. The information gain module 340 computes a respective information gain score for each of the candidate trajectories in the set T that predicts and estimated information gain for a subsequent planning horizon interval [T, 2T] also based on the historic vehicle state data and the current vehicle state is represented in occupancy grids $G_v$, $G_p$.

The collision probability scores and information gain scores computed for each of the trajectories in the set T are provided (along with any other safety, comfort and/or mobility evaluations scores or other evaluation scores generated by trajectory evaluator 334) to trajectory sector 336. Trajectory selector 336 combines the evaluation scores received from trajectory evaluator 334 (for example a linear combination) to generate an overall trajectory score. The candidate trajectory that has the highest overall trajectory score in the set T at the time of computation can be selected as planned trajectory T and communicated to vehicle control system 140 that then provides control instructions (e.g., steering angle and wheel torque commands, among other possible commands) to the vehicle electromechanical system 150 to implement the planned trajectory T. In some examples, combining trajectory evaluation scores and ranking of the trajectories could be performed at trajectory evaluator.

Such a system may, in some examples, enable an autonomous ego vehicle 100 to gain information about the upcoming environment in order to minimize the uncertainty caused by unobserved regions, leading to less conservative motion planning while preserving overall safety. The information gain scoring analysis described above can favor trajectories that are associated with greater entropy, based on assumption that greater entropy enables a higher number of previously unobserved cells to be observed.

Although examples have been described in the context of autonomous vehicles, it should be understood that the present disclosure is not limited to autonomous vehicles. For example, any vehicle that includes advanced driver-assistance system for a vehicle that includes a planning system may benefit from a motion planner that performs the trajectory generation, trajectory evaluation, trajectory selection operations of the present disclosure. Further, any vehicle that includes an automated driving system that can operate a vehicle fully autonomously or semi-autonomously may also benefit from a motion planner that performs the trajectory generation, trajectory evaluation, trajectory selection operations of the present disclosure. A planning system that includes the motion planner of the present disclosure may be useful for enabling a vehicle to navigate a structured or unstructured environment, with static and/or dynamic obstacles.

Although the present disclosure describes methods and processes with operations in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for operating an autonomous vehicle, the method comprising:
    computing a current vehicle state for the autonomous vehicle based on observations by a sensing system, the current vehicle state including environmental data about an environment that the autonomous vehicle interacts with;
    computing, based on the current vehicle state and a target goal, a plurality of candidate trajectories for a current planning horizon interval;
    computing respective collision probability scores for the plurality of candidate trajectories based on the current vehicle state, the collision probability score for each candidate trajectory indicating a probability of the autonomous vehicle colliding along the candidate trajectory with an object in the environment during the current planning horizon interval;
    computing respective information gain scores for the plurality of candidate trajectories based on the current vehicle state, the information gain score for each candidate trajectory indicating a respective information gain for a next planning horizon interval that is subsequent to the current planning horizon interval, each respective information gain representative of a change in uncertainty associated with a respective upcoming environment of the next planning horizon interval, wherein uncertainty is caused by regions of the environment that are unobserved by the sensing system;
    selecting a planned trajectory for the autonomous vehicle from the plurality of candidate trajectories based on the respective collision probability scores and respective information gain scores.

2. The method of claim 1 comprising:
    generating a current occupancy grid that includes a plurality of cells each corresponding to a respective region of the environment, each cell that corresponds to a respective region of the environment that is observed by the sensing system for a current time step being assigned a first cell value when the respective region is observed to be occupied and a second cell value when the respective region is observed to be unoccupied, each cell that corresponds to a respective region of the environment that is unobserved by the sensing system for the current time step being assigned, based on the current vehicle state and assigned cell values of one or more occupancy grids generated for one or more previous time steps prior to the current time step, an occupancy probability value indicating a probability that the cell is occupied,
    the respective information gain scores for the plurality of candidate trajectories being computed based on the current occupancy grid.

3. The method of claim 2 comprising determining a nominal trajectory for the next planning horizon interval, wherein the respective information gain score for each candidate trajectory is computed based on a predicted information gain for the candidate trajectory relative to the nominal trajectory.

4. The method of claim 3 wherein the predicted information gain for each candidate trajectory is determined using a trained convolutional neural network configured to predict a set of visibility grids that each represent a future visibility of the environment to the sensor system for a respective lateral deviation of the nominal trajectory from the current vehicle state, the predicted information gain being based on a combination of the set of visibility grids and the current occupancy grid.

5. The method of claim 4 comprising encoding the nominal trajectory as a region of interest represented by a region of interest grid that includes cells that correspond to the same respective regions of the environment as cells of the current occupancy grid, the trained convolutional neural network receiving the current occupancy grid and the region of interest grid as inputs to predict the set of visibility grids.

6. The method of claim 2 wherein the current occupancy grid comprises a plurality of dynamic agent specific occupancy grids that each correspond to a different class of dynamic agent.

7. The method of claim 2 wherein generating the current occupancy grid comprises:
    generating a current dynamic first agent occupancy grid that includes a plurality of dynamic first agent cells each corresponding to a respective region of the environment that a first class of dynamic agent is expected to travel within, each dynamic first agent cell that corresponds to a respective region of the environment that is observed in the current time step by the sensing system being assigned a first value when the respective region is observed to be occupied by a dynamic agent of the first class and a second value when the respective region is observed to be unoccupied by a dynamic agent of the first class, each dynamic first agent cell that corresponds to a respective region of the environment that is unobserved by the sensing system in the current time step being assigned, based on the current vehicle state and assigned dynamic first agent cell values of one or more dynamic first agent occupancy grids generated for one or more previous time steps prior to a current time step, a dynamic first agent cell probability value indicating a probability that the dynamic first agent cell is occupied by a dynamic agent of the first class;

generating a current dynamic second agent occupancy grid that includes a plurality of dynamic second agent cells each corresponding to a respective region of the environment that a second class of dynamic agent is expected to travel within, each dynamic second agent cell that corresponds to a respective region of the environment that is observed in the current time step by the sensing system being assigned the first value when the respective region is observed to be occupied by a dynamic agent of the second class and the second value when the respective region is observed to be unoccupied by a dynamic agent of the second class, each dynamic second agent cell that corresponds to a respective region of the environment that is unobserved by the sensing system in the current time step being assigned, based on the current vehicle state and assigned dynamic second agent cell values of one or more dynamic second agent occupancy grids generated for one or more previous time steps prior to a current time step, a dynamic second agent cell probability value indicating a probability that the dynamic second agent cell is occupied by dynamic agent of the second class;

combining the current dynamic first agent occupancy grid and the current dynamic second agent occupancy grid to provide the current occupancy grid.

8. The method of claim 7 wherein:

the first class of dynamic agent corresponds to a class of vehicles that are expected to travel on a roadway in accordance with a first set of operating behaviors, and the dynamic first agent cells each correspond to a respective roadway region of the environment; and the second class of dynamic agent corresponds to a class of agents that are expected to travel both on the roadway and on non-roadway regions according to a second set of operating behaviors, and the dynamic second agent cells each correspond to a respective region of the environment that can include one or both of a roadway region or a non-roadway region.

9. The method of claim 8 wherein the second class of dynamic agent can correspond to a pedestrian class.

10. The method of claim 7 wherein computing the respective collision probability scores for the plurality of candidate trajectories comprises:

computing a first collision probability score for each candidate trajectory based on the current dynamic first agent occupancy grid;

computing a second collision probability score for each candidate trajectory based on the current dynamic second agent occupancy grid; and computing the collision probability score for each candidate trajectory based on the first collision probability score and the second candidate probability score for the candidate trajectory.

11. The method of claim 1 wherein:

computing the plurality of candidate trajectories for a current planning horizon interval comprises computing a first set of trajectories, based on the current vehicle state and the target goal, for the current planning horizon interval and filtering the first set of trajectories to include only trajectories that correspond to a set of known safe trajectories in the plurality of candidate trajectories.

12. The method of claim 1 comprising instructing an electromechanical system of the autonomous vehicle to implement the planned trajectory.

13. The method of claim 1 comprising:

generating a current occupancy graph that includes a plurality of nodes each corresponding to a respective region of the environment and a plurality of edges connecting nodes that correspond to neighboring regions, each node that corresponds to a respective region of the environment that is observed by the sensing system for a current time step being assigned a first node value when the respective region is observed to be occupied and a second node value when the respective region is observed to be unoccupied, each node that corresponds to a respective region of the environment that is unobserved by the sensing system for the current time step being assigned, based on the current vehicle state and assigned node values of one or more occupancy graphs generated for one or more previous time steps prior to the current time step, an occupancy probability value indicating a probability that the node is occupied, the respective information gain scores for the plurality of candidate trajectories being computed based on the current occupancy graph.

14. The method of claim 1, wherein the change in uncertainty is representative of a change in Shannon entropy.

15. A processing system comprising:

one or more processing units;

a memory storing instructions which, when executed by the one or more processing units causes the processing system to select a trajectory for an autonomous vehicle by:

receiving a current vehicle state for the autonomous vehicle based on observations by a sensing system, the current vehicle state including environmental data about an environment that the autonomous vehicle interacts with;

computing, based on the current vehicle state and a target goal, a plurality of candidate trajectories for a current planning horizon interval;

computing respective collision probability scores for the plurality of candidate trajectories based on the current vehicle state, the collision probability score for each candidate trajectory indicating a probability of the autonomous vehicle colliding along the candidate trajectory with an object in the environment during the current planning horizon interval;

computing respective information gain scores for the plurality of candidate trajectories based on the current vehicle state, the information gain score for each candidate trajectory indicating a respective information gain for a next planning horizon interval that is subsequent to the current planning horizon interval, each respective information gain representative of a change in uncertainty associated with a respective upcoming environment of the next planning horizon interval, wherein uncertainty is caused by regions of the environment that are unobserved by the sensing system; and selecting a planned trajectory for the autonomous vehicle from the plurality of candidate trajectories based on the respective collision probability scores and respective information gain scores.

16. The system of claim 15 wherein the instructions, when executed by the one or more processing units causes the processing system to:

generate a current occupancy grid that includes a plurality of cells each corresponding to a respective region of the environment, each cell that corresponds to a respective region of the environment that is observed by the sensing system for a current time step being assigned a first cell value when the respective region is observed to be occupied and a second cell value when the respective region is observed to be unoccupied, each cell that corresponds to a respective region of the environment that is unobserved by the sensing system for the current time step being assigned, based on the current vehicle state and assigned cell values of one or more occupancy grids generated for one or more previous time steps prior to the current time step, an occupancy probability value indicating a probability that the cell is occupied, the respective information gain scores for the plurality of candidate trajectories being computed based on the current occupancy grid.

17. The system of claim 16 wherein the instructions when executed by the one or more processing units causes the processing system to determine a nominal trajectory for the next planning horizon interval, wherein the respective information gain score for each candidate trajectory is computed based on a predicted information gain for the candidate trajectory relative to the nominal trajectory.

18. The system of claim 17 wherein the predicted information gain for each candidate trajectory is determined using a trained neural network based on the current occupancy grid and the candidate trajectory.

19. The system of claim 18 wherein the trained neural network is a convolutional neural network configured to predict a set of visibility grids that each represent a future visibility of the environment to the sensor system for a respective lateral deviation of the nominal trajectory from the current vehicle state, the predicted information gain being based on a combination of the set of visibility grids and the current occupancy grid.

20. The system of claim 16 wherein the instructions when executed by the one or more processing units causes the processing system to encode the nominal trajectory as a region of interest represented by a region of interest grid that includes cells that correspond to the same respective regions of the environment as cells of the current occupancy grid, the trained convolutional neural network receiving the current occupancy grid and the region of interest grid as inputs to predict the set of visibility grids.

21. The system of claim 16 wherein the current occupancy grid is generated by:

generating a current dynamic first agent occupancy grid that includes a plurality of dynamic first agent cells each corresponding to a respective region of the environment that a first class of dynamic agent is expected to travel within, each dynamic first agent cell that corresponds to a respective region of the environment that is observed in the current time step by the sensing system being assigned a first value when the respective region is observed to be occupied by a dynamic agent of the first class and a second value when the respective region is observed to be unoccupied by a dynamic agent of the first class, each dynamic first agent cell that corresponds to a respective region of the environment that is unobserved by the sensing system in the current time step being assigned, based on the current vehicle state and assigned dynamic first agent cell values of one or more dynamic first agent occupancy grids generated for one or more previous time steps prior to a current time step, a dynamic first agent cell probability value indicating a probability that the dynamic first agent cell is occupied by a dynamic agent of the first class;

generating a current dynamic second agent occupancy grid that includes a plurality of dynamic second agent cells each corresponding to a respective region of the environment that a second class of dynamic agent is expected to travel within, each dynamic second agent cell that corresponds to a respective region of the environment that is observed in the current time step by the sensing system being assigned the first value when the respective region is observed to be occupied by a dynamic agent of the second class and the second value when the respective region is observed to be unoccupied by a dynamic agent of the second class, each dynamic second agent cell that corresponds to a respective region of the environment that is unobserved by the sensing system in the current time step being assigned, based on the current vehicle state and assigned dynamic second agent cell values of one or more dynamic second agent occupancy grids generated for one or more previous time steps prior to a current time step, a dynamic second agent cell probability value indicating a probability that the dynamic second agent cell is occupied by dynamic agent of the second class;

combining the current dynamic first agent occupancy grid and the current dynamic second agent occupancy grid to provide the current occupancy grid, wherein:

the first class of dynamic agent corresponds to a class of vehicles that are expected to travel on a roadway in accordance with a first set of operating behaviors, and the dynamic first agent cells each correspond to a respective roadway region of the environment; and the second class of dynamic agent corresponds to a class of agents that are expected to travel both on the roadway and on non-roadway regions according to a second set of operating behaviors, and the dynamic second agent cells each correspond to a respective region of the environment that can include one or both of a roadway region or a non-roadway region.

22. The system of claim 21 wherein respective collision probability scores for the plurality of candidate trajectories are computed by:

computing a first collision probability score for each candidate trajectory based on the current dynamic first agent occupancy grid;

computing a second collision probability score for each candidate trajectory based on the current dynamic second agent occupancy grid; and computing the collision probability score for each candidate trajectory based on the first collision probability score and the second candidate probability score for the candidate trajectory.

23. A non-transitory computer-readable medium storing instructions for execution by a processing system of a system for selecting a trajectory for an autonomous vehicle, the instructions when executed causing the processing system to:

receive a current vehicle state for the autonomous vehicle based on observations by a sensing system, the current vehicle state including environmental data about an environment that the autonomous vehicle interacts with;

compute, based on the current vehicle state and a target goal, a plurality of candidate trajectories for a current planning horizon interval;

compute respective collision probability scores for the plurality of candidate trajectories based on the current vehicle state, the collision probability score for each candidate trajectory indicating a probability of the autonomous vehicle colliding along the candidate trajectory with an object in the environment during the current planning horizon interval;

compute respective information gain scores for the plurality of candidate trajectories based on the current vehicle state, the information gain score for each candidate trajectory indicating a respective information gain for a next planning horizon interval that is subsequent to the current planning horizon interval, each respective information gain representative of a change in uncertainty associated with a respective upcoming environment of the next planning horizon interval, wherein uncertainty is caused by regions of the environment that are unobserved by the sensing system; and select a planned trajectory for the autonomous vehicle from the plurality of candidate trajectories based on the respective collision probability scores and respective information gain scores.

* * * * *

UNITED STATES PATENT AND TRADEMARK OFFICE
CERTIFICATE OF CORRECTION

PATENT NO. : 11,834,077 B2  
APPLICATION NO. : 17/474751  
DATED : December 5, 2023  
INVENTOR(S) : Armin Sadeghi et al.

Page 1 of 3

It is certified that error appears in the above-identified patent and that said Letters Patent is hereby corrected as shown below:

In the Specification

Column 20, Lines 47-49:

" $\mathbb{P}(c^t=1|O^{0-}\cup O^0)=\Pi_{c_i \in G_p}[1-\mathbb{P}(c_i^0,c^t)\mathbb{P}(c_i^0=1|O^{0-}\cup O^0)],$ "

Should read:

-- $\mathbb{P}(c^t = 1|O^{0-} \cup O^0) = \Pi_{c_i \in G_p}[1 - \mathbb{P}(c_i^0, c^t)\mathbb{P}(c_i^0 = 1|O^{0-} \cup O^0)]$ --

Column 21, Line 35:

"environment $O^s \cup O^\delta$"  
Should read:

-- environment $O^{s-} \cup O^s$ --

Signed and Sealed this  
Fifteenth Day of April, 2025

Coke Morgan Stewart  
*Acting Director of the United States Patent and Trademark Office*

CERTIFICATE OF CORRECTION (continued)
U.S. Pat. No. 11,834,077 B2

Column 21, Line 37:

"Time horizon $\lceil \delta, \delta+T \rceil$ for $\delta s$, is:"

Should read:

-- Time horizon $[\delta, \delta + T]$ for $\delta \geq s$, is: --

Column 21, Lines 39-40:

"$$\mathbb{E}(E(\mathcal{T}^{\delta,\delta+T})|O^{s-} \cup O^s) = 1 - \Pi_{c \in G_n \cup G_v} \Pi_{t=\delta}^{\delta+T} \mathbb{P}(c^t = 0 \cup O^s) I(c, q^t).$$"

Should read:

$$\mathbb{E}(E(\mathcal{T}^{\delta,\delta+T})|O^{s-} \cup O^s) = 1 - \prod_{c \in G_p \cup G_v} \prod_{t=\delta}^{\delta+T} \mathbb{P}(c^t = 0 | O^{s-} \cup O^s) I(c, q^t).$$

--   --

Column 22, Lines 42-45:

"$$\mathbb{P}(E(\mathcal{T}^{T,2T}) = 1 | O^{s-} \cup O^s) = 1 - \prod_{c_i \in G_p \cup G_v} \prod_{t=T}^{2T} \mathbb{P}(c_i^t = 0 | O^{s-} \cup O^s) I(c_i, q^t),$$"

Should read:

$$\mathbb{P}(E(\mathcal{T}^{T,2T}) = 1 | O^{s-} \cup O^s) = 1 - \prod_{c_i \in G_p \cup G_v} \prod_{t=T}^{2T} \mathbb{P}(c_i^t = 0 | O^{s-} \cup O^s) I(c_i, q^t),$$

--   --

Column 22, Lines 47-54:

"$\mathbb{P}(c_i^t = 0 \mid O^{h-} \cup O^s) =$ $\prod_{c_j \in G_p \cup G_v} [\mathbb{P}(c_j^s = 0 \mid O^{s-} \cup O^s) + (1 - \mathbb{P}(c_i^t \mid c_j^s))\mathbb{P}(c_j^s = 1 \mid O^{s-} \cup O^s)]$ $= \prod_{c_j \in G_p \cup G_v} [1 - \mathbb{P}(c_i^t \mid c_j^s)\mathbb{P}(c_j^s = 1 \mid O^{s-} \cup O^s)].$"

Should read:

-- $\mathbb{P}(c_i^t = 0 \mid O^{s-} \cup O^s) = \Pi_{c_j \in G_p \cup G_v}$ $[\mathbb{P}(c_j^s = 0 \mid O^{s-} \cup O^s) + (1 - \mathbb{P}(c_i^t \mid c_j^s))$ $\mathbb{P}(c_j^s = 1 \mid O^{s-} \cup O^s)]$ $= \Pi_{c_j \in G_p \cup G_v} [1 - \mathbb{P}(c_i^t \mid c_j^s)$ $\mathbb{P}(c_j^s = 1 \mid O^{s-} \cup O^s)].$ --